United States Patent [19]
Boyle, Jr. et al.

[11] Patent Number: 4,710,545
[45] Date of Patent: Dec. 1, 1987

[54] POLYMER-BOUND ALKYL DIARYLPHOSPHINITE CATALYST COMPOSITIONS AND PROCESSES FOR MAKING SAME

[75] Inventors: William J. Boyle, Jr., Warren; Frank Mares, Whippany; Andrea M. Corbo, Randolph, all of N.J.

[73] Assignee: Allied Corporation, Morris Township, Morris County, N.J.

[21] Appl. No.: 766,997

[22] Filed: Aug. 19, 1985

Related U.S. Application Data

[60] Division of Ser. No. 636,181, Jul. 31, 1984, Pat. No. 4,581,415, which is a continuation-in-part of Ser. No. 438,686, Nov. 3, 1983, abandoned.

[51] Int. Cl.$^4$ .............................................. C08F 8/40
[52] U.S. Cl. .................... 525/340; 525/359.1; 525/359.3; 526/274
[58] Field of Search .............. 525/340, 359.1, 359.3

[56] References Cited

U.S. PATENT DOCUMENTS

| | | | |
|---|---|---|---|
| 3,168,502 | 2/1965 | Sexsmith et al. | 525/340 |
| 3,220,989 | 11/1965 | Rolih et al. | 525/340 |
| 3,652,678 | 3/1972 | Allum et al. | 525/340 |
| 3,708,462 | 1/1973 | McKinley et al. | 525/340 |
| 3,725,365 | 4/1973 | McKinley et al. | 525/340 |
| 3,903,044 | 9/1975 | Wang | 525/340 |
| 3,993,635 | 11/1976 | Mango, III | 525/340 |
| 4,007,318 | 2/1977 | Mango, III et al. | 525/340 |
| 4,200,721 | 4/1980 | Paciorek | 525/340 |
| 4,382,130 | 5/1983 | Ellison et al. | 525/340 |

*Primary Examiner*—Joseph L. Schofer
*Assistant Examiner*—Bernard Lipman
*Attorney, Agent, or Firm*—Richard C. Stewart; Gerhard H. Fuchs

[57] ABSTRACT

Polymer-bound alkyl diarylphosphinite catalyst compositions having the formula I:

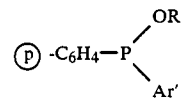

wherein the trivalent phosphorus is substituted by one alkoxy group and one aryl group and wherein the third bond of phosphorus is a P-C bond to a pendant aryl groups of the polymer matrix and wherein ⓟ—C$_6$H$_4$— is a polymer matrix containing aromatic groups such as polystyrene cross-linked with divinylbenzene and wherein at least 1% of pendant aryl groups of the polymer matrix are bound to phosphorus and wherein Ar is substituted by electron-donating groups such as alkyl, alkoxy, and N,N-dialkylamino, are disclosed. Polymer-bound aryl dialkyl phosphonites having the formula II, ⓟ—C$_6$H$_4$—P(OR)$_2$ and polymer-bound diarylphosphinous chlorides having the formula ⓟ—C$_6$H$_4$—P—(Ar')—Cl are also disclosed. Processes for making the polymer-bound phosphinites, phosphonites and phosphinous chlorides are also disclosed.

5 Claims, 9 Drawing Figures

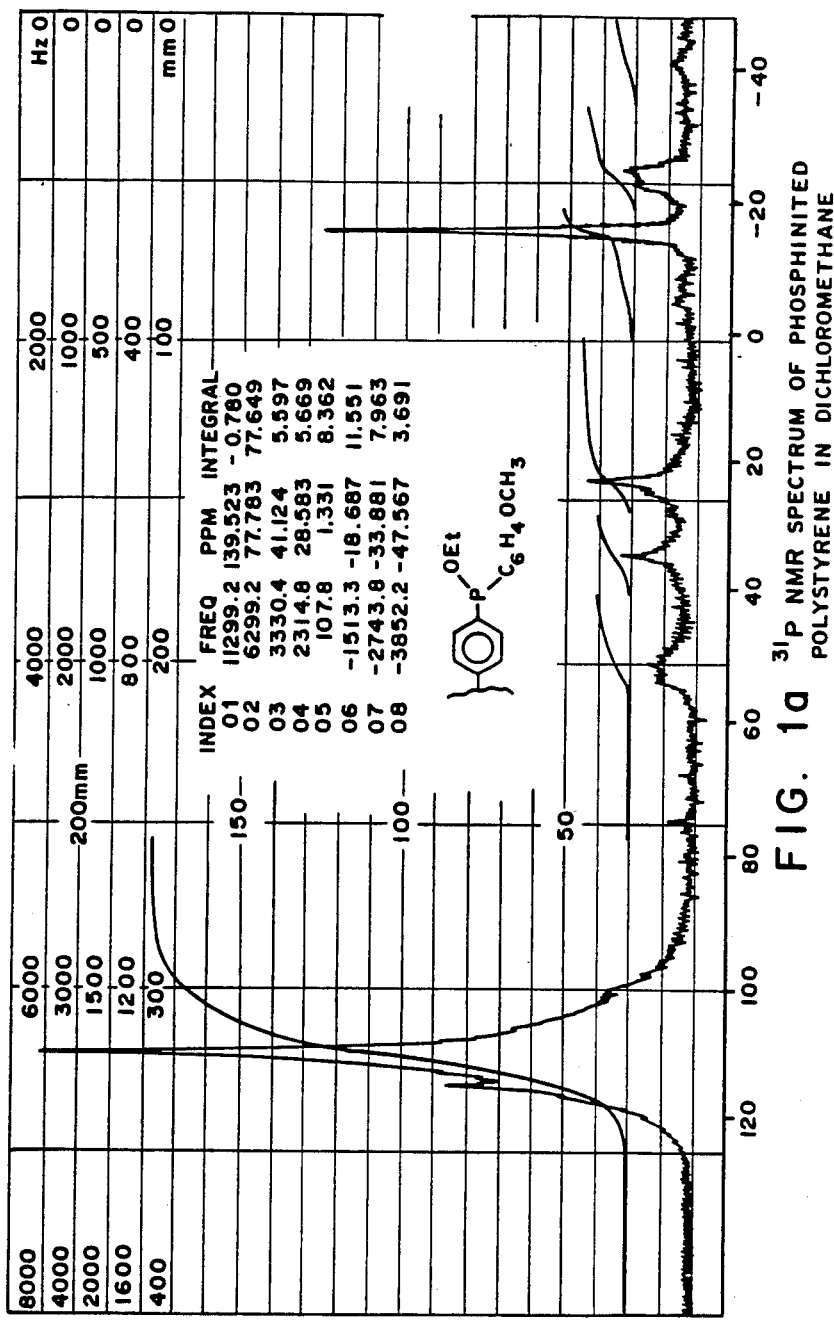
FIG. 1a $^{31}P$ NMR SPECTRUM OF PHOSPHINITED POLYSTYRENE IN DICHLOROMETHANE

POLYMER-BOUND ALKYL DIARYLPHOSPHINITE CATALYST COMPOSITIONS AND PROCESSES FOR MAKING SAME

CROSS-REFERENCE TO RELATED APPLICATIONS

This application is a division of application Ser. No. 636,181, filed 7/31/84, now U.S. Pat. No. 4,581,415, which in turn is a c-i-p of application Ser. No. 438,686, filed 11/3/83 now abandoned.

This application is related to U.S. Pat. application Ser. No. 438,687 by same inventive entity and filed on Nov. 3, 1983, now U.S. Pat. No. 4,574,060.

BACKGROUND OF THE INVENTION

This invention relates to polymer-bound alkyl diarylphosphinite catalyst compositions having the formula I:

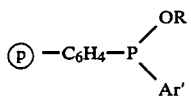

wherein the trivalent phosphorus is substituted by one alkoxy group and one aryl group and wherein the third bond of phosphorus is a P—C bond to a pendant aryl group of the polymer matrix and processes for making same.

The dimerization of acrylonitrile to 1,4-dicyano-1-butene has been much investigated as a route to adiponitrile which is hydrogenated to hexamethylene diamine, the nylon 6,6 monomer.

A process for the dimerization of acrylonitrile in the presence of phosphines ($PR_3$) and phosphites ($P(OR)_3$) to give a 2:1 mixture of 2,4-dicyano-1-butene and cis- and trans-1,4-dicyano-1-butenes is disclosed in C.A., Vol. 62 (1965), 14508e (D. W. Henberg, et al.).

Tetrahedron Letters (1966) No. 51, pp 6347–51, (W. H. Dietsche) discloses that alkyl diarylphosphinites having the formula $Ar_2POR$ in the presence of t-butanol or aqueous acetic acid effects dimerization of acrylonitrile to 2,4-dicyano-1-butene (2-methyleneglutaronitrile) and 1,4-dicyano-1-butene.

The dimerization of acrylonitrile (ACN) in the presence of various tervalent oxygen-containing phosphorus (III) catalyst compositions and a mixture of a hydrocarbon such as toluene and a proton-donating solvent such as 2-propanol has been disclosed in a series of U.S. patents granted to personnel of Imperial Chemical Industries (ICI).

U.S. Pat. No. 4,102,915 (Jennings et al.) discloses that a process for dimerization of ACN to substantially linear $C_6$ dimers using soluble organic phosphinites or phosphonites as catalysts is effected in the presence of a proton-donating solvent and optionally a hydrocarbon co-solvent, wherein ACN and solvents are dry and free of oxygen and wherein at least one of the solvents has a boiling point higher than ACN and is capable of phase separation with respect to dimeric products, to enable unreacted ACN to be removed by distillation and the solvent(s) and dimeric products to be separated.

U.S. Pat. No. 4,316,857 (Gilbert) discloses a soluble phosphonite or phosphinite catalyzed ACN dimerization process that uses as a solvent a mixture of a proton-donating organic solvent, an aromatic hydrocarbon solvent and an aliphatic hydrocarbon solvent in a specified ratio so as to facilitate product isolation such as by phase separation or liquid extraction.

U.S. Pat. No. 4,238,422 (Cozens et al.) discloses soluble aryl phosphinites and phosphonites useful as ACN dimerization catalysts wherein the aryl groups are substituted by at least one electron-donating group.

U.S. Pat. Nos. 4,138,428 and 4,190,616 (Jennings et al.,) disclose ACN dimerization process and soluble organic phosphinite or phosphonite catalysts having at least one aryl group substituted by electron-donating substituents. U.S. Pat. No. 4,263,224 (Jennings et al.) discloses ACN dimerization process wherein an aryl phosphonite or phosphinite is added as a low-cost scavenging reagent to a mixture of ACN and organic solvent to remove therefrom residual traces of water or other catalyst deactivating impurities before contacting said reaction mixture with a more expensive soluble aryl phosphinite or aryl phosphonite dimerization catalyst.

U.S. Pat. No. 4,126,632 (Hogan et al.) discloses a process for the dimerization of ACN to straight chain 1,4-dicyanobutenes by contacting ACN with organic phosphinite or phosphonite catalyst having the formula $R_1R_2R_3P$ or $(R_1R_2P)_2R_4$ wherein at least one of the R groups $R_2$ or $R_3$ is alkoxy or cycloalkoxy and R, is alkylene or alkylenedioxy, in the presence of an inert proton-donating solvent and optionally an inert hydrocarbon co-solvent. While said Hogan et al. patent also provides examples of soluble phosphinites and phosphonite wherein groups $R_1$ to $R_4$ are alkyl, aryl, cycloalkyl, polyalkylene, etc., the patent also discloses without examples that groups $R_1$ to $R_4$ may also be part of a polymeric backbone, for example, polystyrene or polyvinylalcohol or be linked to an inorganic support, for example, silica or alumina, so as to form a heterogeneous catalyst.

U.S. Pat. Nos. 4,059,542 and 4,089,890 (Jennings, et al.) disclose that silica- or alumina-bound phosphinites or phosphonites as heterogeneous, i.e., insoluble catalyst compositions may only be used for the gas-phase dimerization of acrylonitrile at temperatures above 150° C. When the best phosphinite-bound to silica catalyst disclosed in U.S. Pat. Nos. 4,059,542 and 4,089,890 was employed for dimerization of ACN in the gas phase at 170°–190° C., only low conversions (7–20%) of ACN into an economically unattractive 3:1 (maximum value) mixture of straight and branched chain dimers and an unspecified amount of oligomers were observed.

The processes using soluble catalysts disclosed in these ICI patents produce 1,4-dicyano-1-butene, the desired linear dimer, at moderate conversions, in high selectivity with lesser amounts of the branched dimer, methyleneglutaronitrile and oligomers. However, the ACN dimerization processes employing homogeneous, i.e., soluble alkyl diarylphosphinites substituted by electron-donating groups have the following disadvantages. At the end of each ACN dimerization run, before distillation of the desired dimeric products, the soluble phosphinite catalyst must either be removed by complicated extraction procedures or decomposed with water. The extraction procedures inherently result in appreciable losses of the soluble phosphinite catalysts for two reasons. Firstly, the differences in the solubility of the soluble phosphinite catalyst in the solvents are not infinite, and thus, several extractions of the catalyst are required. Secondly, extraction enhances the chances for contamination of the solvents, unreacted ACN and catalyst with moisture and oxygen, impurities which deactivate the catalyst. Decomposition of the soluble phosphinite catalyst by the addition of water substantially increases catalyst consumption and contaminates the reaction solvents (isopropanol and toluene) and unreacted ACN with water and/or oxygen. Thus, after extraction and decomposition procedures, the reaction solvents and unreacted ACN must be degassed and redried before the recycle of same. In the case of isopropanol and ACN, degassing and redrying are very costly and time consuming steps.

One way in which the workup of the dimerization reaction could be greatly simplified, while simultaneously conserving the expensive catalyst, would be to support the catalyst on a polymer matrix. C. U. Pitman, et al. (CHEMTECH, Sept. 1973, pp 560–566) disclose that soluble catalysts, e.g., transition metal catalyst, may be bound to polymer backbones. See also Paper No. 29 by W. O. Haag, et al., in "Proc. 5th International Congress on Catalysis", Vol 1, pp 465–472 (1973) and an article by D. D. Whitehurst in CHEMTECH, January, 1980, pp 44–49.

During the course of development of the present invention, phosphinites bound to organic polymer matrices via P—O—C bonds were prepared and were found to be impractical and inactive catalysts for ACN dimerization. Similarly, phosphinites bound via P—O—M bonds to inorganic matrices (M), as disclosed in U.S. Pat. Nos. 4,089,890 and 4,059,542 (ICI), possess a low activity and low selectivity and may be used only for gas phase ACN dimerizations. Although the above identified ICI U.S. Patents mention the use of polystyrene-bound phosphinites, no working example of the use and/or preparation of same is given in the above identified ICI U.S. Patents or in other published literature of which we are aware.

Accordingly, it is an object of the present invention to provide polymer-bound ACN dimerization catalysts that avoid the complicated workup and product isolation procedures of prior art while preserving the integrity of the catalysts.

It is another object of the present invention to provide processes for making the polymer-bound catalysts useful for selective dimerization of ACN.

These and other objects and advantages of the present invention will become obvious in view of the following description.

SUMMARY OF THE INVENTION

According to an object of the present invention, we provide a substance having the formula I:

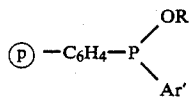
I wherein the trivalent phosphorus is substituted by one alkoxy group and one aryl group and wherein the third bond of phosphorus is a P—C bond to a pendant aryl group of the polymer matrix, wherein ⓟ —C$_6$H$_4$— is derived from a polymer ⓟ —C$_6$H$_5$ containing aryl groups wherein at least 1% of the pendant aryl groups of a polymer matrix are bound to phosphorus and wherein said substance is substantially free of C=O, OH or NH or SH groups and wherein Ar' is an aromatic group having the formula:

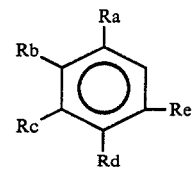
(A)

wherein $R_a$, $R_b$, $R_c$, $R_d$, and $R_e$ are independently hetero-atom-containing electron-donating groups selected from the group consisting of —OR$^3$ and —N(R$^4$, R$^5$) or hydrogen or alkyl groups having 1 to 10 carbon atoms or cycloalkyl groups having 5 to 10 carbon atoms or wherein two of said R groups form part of a fused alicyclic ring and the remainder of said R groups are defined as hereinabove or wherein at least one of $R_a$, $R_b$, $R_c$, $R_d$, and $R_e$, is a heteroatom-containing electron-donating group selected from —OR$^3$ and —N(R$^4$, R$^5$) wherein R$^3$, R$^4$, and R$^5$ are independently straight and branched chain alkyl groups having 1 to 10 carbons or cycloalkyl groups having 5 to 10 carbon atoms and the remainder of said $R_{a-e}$ groups are independently hydrogen or alkyl or cycloalkyl as defined hereinabove.

In another aspect of the present invention, we provide a process for preparation of polymeric substance having the formula I, ⓟ —C$_6$H$_4$—P—(Ar')OR which comprises the steps of:

(a) brominating at least about 1% of the pendant aromatic groups of a polymer matrix having the formula ⓟ —C$_6$H$_5$;

(b) contacting the brominated aromatic-containing polymer produced in step (a) with at least a stoichiometric amount of a lithium compound selected from the group consisting of LiNH$_2$, LiNHR$^7$, LiNR$^7$R$^8$ and LiR$^7$ wherein R$^7$ and R$^8$ are independently alkyl groups having 1 to 8 carbons or cycloalkyl groups having 5 to 12 carbons;

(c) contacting the lithiated aromatic-containing polymer produced in step (b) with aryl phosphorus compound selected from the group consisting of Ar'P(X)OR and Ar'P(OR)$_2$, wherein Ar' is an aromatic group having the formula:

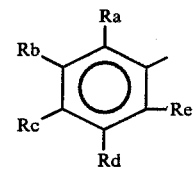
(B)

wherein $R_a$, $R_b$, $R_c$, $R_d$, and $R_e$ are as described above; and wherein X is halogen and wherein R is a straight or branched alkyl group 1 to 10 carbons or a cycloalkyl group of 5 to 10 carbons; and (d) recovering a polymeric substance having the formula ⓟ —C$_6$H$_4$—P(Ar')OR.

In still another aspect of the present invention, we provide a process for the preparation of a polymeric substance having formula I, ⓟ —C$_6$H$_4$—(Ar')OR which comprises the steps of:

(a) contacting a polymer containing aromatic groups with PX$_3$, in the presence of an effective amount of a Friedel-Crafts catalyst, for a time sufficient to produce a polymer containing aromatic groups substituted with PX$_2$, wherein X is F, Cl, Br or I;

(b) contacting the polymer containing the aromatic groups substituted with PX$_2$, in the presence of an effective amount of a Friedel-Crafts catalyst, with an aromatic compound Ar'H having formula:

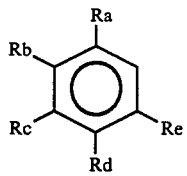

(C)

wherein R$_a$, R$_b$, R$_c$, R$_d$, and R$_e$ are independently N,N-dialkylamino groups —N(R$^4$, R$_5$) [wherein R$^4$ and R$^5$ are alkyl(C$_1$–C$_{10}$) or cycloalkyl (C$_5$–C$_{10}$) groups], hydrogen, straight or branched chain alkyl groups of 1 to 10 carbons or cycloalkyl groups having 5 to 10 carbons or wherein two of said R$_{a-e}$ groups form part of a fused alicyclic ring and the remainder of said R$_{a-e}$ groups are independently hydrogen, N,N-dialkylamino groups —N(R$^4$, R$^5$) alkyl groups having 1 to 10 carbons or cycloalkyl groups having 5 to 10 carbons, or wherein at least one of said R$_{a-e}$ groups is a N,N-dialkylamino group, —N(R$^4$, R$^5$) and the remainder of said R$_{a-e}$ groups are independently hydrogen or alkyl or cycloalkyl as defined hereinabove, for a time sufficient to produce a polymer having formula ⓟ—C$_6$H$_4$—P(Ar')X and containing residual metal-containing species;

(c) contacting the product of step (b) with an aprotic solvent and water in an amount sufficient to produce a polymer having the formula ⓟ—C$_6$H$_4$—P(=O)(Ar')H substantially free of residual aluminium-containing species;

(d) contacting the product of step (c) with PX$_3$ wherein X is defined as hereinabove in an amount sufficient to produce a polymer having the formula ⓟ—C$_6$H$_4$—P(Ar')X; and (e) contacting the product of step (d) with a straight or branched chain alkanol having no more than 10 carbons or cycloalkanol having 5 to 10 carbon atoms in the presence of a base for a time sufficient to produce a polymer having formula ⓟ—C$_6$H$_4$—P(Ar')OR.

The present invention also contemplates the following specific substances having the following formulas:
ⓟ—C$_6$H$_4$—P[p—CH$_3$OC$_6$H$_4$—]—OR;   ⓟ—C$_6$H$_4$—P—[(CH$_3$)$_2$C$_6$H$_3$—]—OR;   ⓟ—C$_6$H$_4$—P[(CH$_3$)$_2$C$_6$H$_3$—]—Cl, ⓟ—C$_6$H$_4$—P[(CH$_3$)$_3$C$_6$H$_2$—]—Cl   and   ⓟ—C$_6$H$_4$—P(OR)$_2$ wherein ⓟ—C$_6$H$_4$ is derived from the polymer polystyrene ⓟ—C$_6$H$_5$) and wherein R is cyclohexyl, CH$_3$—, C$_2$H$_5$— or i—C$_3$H$_7$—.

BRIEF DESCRIPTION OF THE DRAWINGS

FIGS. 1a and 1b are $^{31}$P NMR Spectra of preferred embodiments of a polymer-bound phosphinite catalyst of the present invention.

DETAILED DESCRIPTION OF THE INVENTION

The present invention provides polymer-bound alkyl diarylphosphinite compositions having the formula I useful as catalysts for dimerization of acrylonitrile. The dimerization may be operated batchwise or continuously with high selectivity and high percent conversion as described in our application U.S. Ser. No. 438,687, filed Nov. 3, 1983, the disclosure of which is incorporated herein by reference.

The present invention also provides polymer-bound dialkyl arylphosphonites useful for lowering the water content of the liquid phase comprising acrylonitrile, inert solvent and proton-donating solvent and containing less than about 30 ppm of water, preferably less then about 15 ppm to a value less than 5 ppm or even 2–3 ppm of water.

Figure 6:
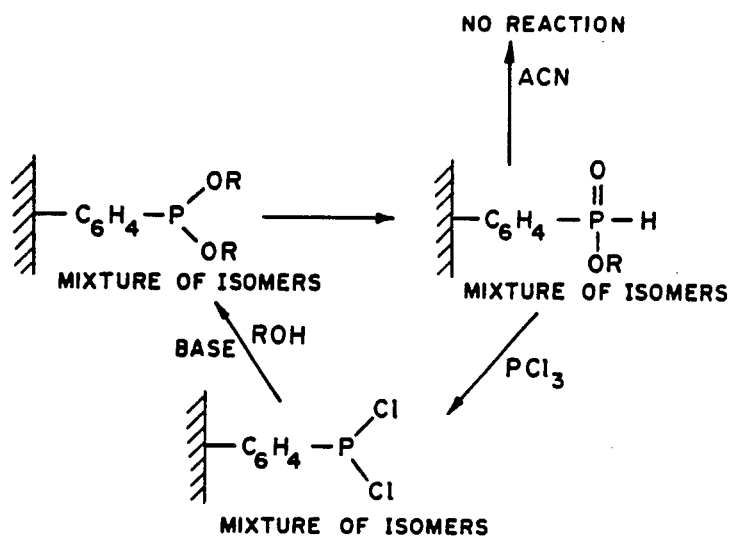
FIG. 6 schematically illustrates the reaction of a polymer-bound dialkyl arylphosphonite with water to form a product that does not react with ACN.
Figure 7:
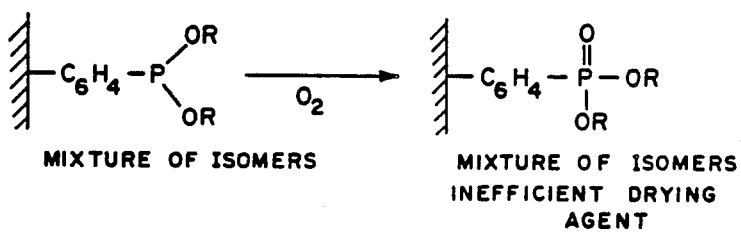
FIG. 7 schematically illustrates the reaction of polymer-bound dialkyl phosphonite with oxygen to form catalytically inactive phosphorus [V].

The polymer-bound dialkyl phosphonites prepared in one way (a combination of synthetic pathways illustrated in FIGS. 8 and 6 and described below) were surprisingly effective drying agents that extended the effective service lifetime of the polymer-bound alkyl diarylphosphinites in the acrylonitrile dimerization reaction. The alkyl groups in the polymer-bound dialkyl arylphosphonite of the present invention are aliphatic groups having 1 to 10 carbons and cyclic groups having 5 to 10 carbons. Secondary aliphatic groups of 3 to 10 carbons and cyclic groups having 5 to 12 carbons are more preferred. Isopropyl groups are most preferred. Primary alkyl groups are less preferred. Tertiary alkyl and aryl groups, e.g., tert-butyl and phenyl, are to be avoided.

The polymer-bound catalyst of the present reaction comprises a polymer-bound alkyl diarylphosphinite having the formula I, ⓟ—C$_6$H$_4$—P(Ar')OR wherein the trivalent phosphorus is substituted by one alkoxy group and one aryl group and wherein the third bond of phosphorus is a P—C bond to a pendant aryl group of a polymer matrix.

Among the polymers of the polymer-bound catalyst found useful in the present invention are polystyrene and polystyrene cross-linked with about 1 to 40 percent by weight of divinylbenzene and in the form of micro- or macro-reticular beads or clusters of beads. Preferably, the polymer of the polymer-bound catalyst comprises polystyrene cross-linked with 1 percent of divinylbenzene.

By the term "effective amount of polymer-bound catalyst", as used herein, is meant that at least 1% of the pendant aryl groups of polystyrene in formula I is substituted with phosphorus in the form of phosphinite. Conveniently, at least about 5 to about 100% of the pendant aromatic rings bound to polymer backbone are substituted by phosphorus. In the preferred mode of preparation of polymer-bound catalyst of the present invention, at least about 25–100%, preferably about 80% or more of the phosphorus bound to the aromatic rings was in the form of phosphinite.

The aromatic ring (Ar') bound only to phosphorus in the polymer-bound alkyl diarylphosphinite has the formula and structure described above as formulae A and B. Aromatic rings containing at least one heteroatom-containing electron-donating group or two alkyl groups are preferred as Ra thru R. Aromatic rings containing only H are less preferred.

Among the heteroatom-containing electron-donating groups found useful in the catalyst of the present invention are alkoxy ($OR^3$), N,N-dialkylamino [—$N(R^4, R^5)$] wherein the alkyl groups $R^3$, $R^4$, $R^5$ are straight or branched chain aliphatic groups of one to ten carbons or cycloalkyl groups of five to ten carbons. Preferred heteroatom-containing electron-donating groups are $CH_3O$—, $C_2H_5O$—, i—$C_3H_7O$—, $(CH_3)_2N$—, $(C_2H_5)_2N$—, and (n—$C_3H_7)_2N$.

Among the aromatic groups attached only to phosphorus that are useful in the polymer-bound diaryl phosphinite catalyst of the present invention are p-alkoxylphenyl, p-N,N-dialkylaminophenyl, 2,3,4,5-tetraalkylphenyl; 3,4,5-, 2,3,5- 2,4,5- and 2,3,4-trialkylphenyl, and 2,3-, 2,4-, 2,5 and 3,4-dialkylphenyl, wherein alkyl has one to ten carbons and is preferably methyl.

The polymer-bound alkyl diarylphosphinite catalysts of the present invention contain at least 1% of aromatic groups pendant to the polymer matrix bound to phosphorus. They are substantially free of C=O groups such as e.g., aldehydes, ketones, esters and amides, or —OH, NHR or —$NH_2$, or SH that may react with phosphinite phosphorus or otherwise interfere with activity of the phosphinite as a selective acrylonitrile dimerization catalyst. Preferred polymer-bound catalysts of the present invention include ⓟ—$C_6H_4$—P(-p—$CH_3OC_6H_4$—)OR, ⓟ—$C_6H_4$—P($CH_3)_xC_6H_{(5-x)}$—]OR (with x being 2 or 3); wherein ⓟ—$C_6H_4$— is derived from a polymer which comprises polystyrene ⓟ—$C_6H_5$, and preferably which consists essentially of polystyrene cross-linked with at least about 1 weight % of divinylbenzene and more preferably polystyrene cross-linked with about 1–40 weight % of divinylbenzene and in the form of micro- or macro-reticular beads or clusters of beads; and wherein R is selected from the group consisting of straight and branched chain aliphatic groups having one to ten carbon atoms and cycloalkyl groups having five to ten carbon atoms. Preferred R groups are cyclohexyl, methyl, ethyl and groups having formula $R^1R^2C(H)$— wherein $R^1$ and $R^2$ are independently selected from hydrogen and straight and branched chain alkyl groups having 1 to 9 carbon atoms such as isopropyl.

Figure 5:
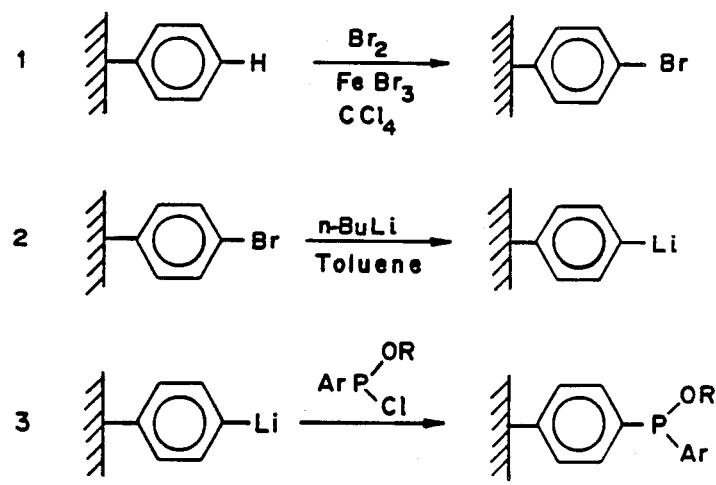
FIG. 5 schematically illustrates another synthetic pathway for preparation of a polymer-bound alkyl diarylphosphinite catalyst of the present invention.

The present invention also includes a process for preparation of polymeric substance of the present invention having formula I, i.e., ⓟ—$C_6H_4$—P(Ar')OR which comprises the steps of (1) brominating at least about 1%, preferably at least about 5–100% of the pendant aryl groups of the aryl-containing polymers defined hereinabove; (2) contacting the brominated aromatic-containing polymer so formed with at least a stoichiometric amount or excess, e.g., 2–3 equivalents of a lithium compound selected from the group consisting of $LiNH_2$, $LiNH^7$, $LiNR^{7R8}$ and $LiR^7$ wherein $R^7$ and $R^8$ are independently selected as alkyl groups having one to eight carbon atoms or cycloalkyl containing five to ten carbon atoms; (3) contacting the lithiated aryl-containing polymer so formed with an excess, e.g., 2 to 3 equivalents of an aryl phosphorus compound, hereinafter called phosphiniting agents, and selected from the group consisting of Ar'P(X)(OR), Ar'P(OR)$_2$, and Ar'PX$_2$ wherein Ar' is an aryl group substituted with alkyl, cycloalkyl or heteroatom-containing electron-donating groups described hereinabove preferably with heteroatom-containing electrondonating groups; and X is halogen, preferably Cl, and R is a straight or branched alkyl group of one to ten carbon atoms or cycloalkyl group of five to ten carbon atoms; and finally, (4) recovering a polymeric substance having the formula I: ⓟ—$C_6H_4$—P(Ar')OR. FIG. 5 schematically illustrates a preferred synthetic pathway for preparation of polystyrene-bound alkyl diarylphosphinites of the present invention.

The bromination reaction illustrated in FIG. 5 is conventional and results in almost exclusive parabromination and is described by S. E. Jacobson, et al., in JACS, 1979, 101, 6938, which is hereby incorporated by reference.

The reaction with a lithium compound which is preferably methyl or n-butyl lithium is performed in inert hydrocarbon solvents such as toluene or heptane at 50°–75° C. for 3 hrs. See, for example, M. J. Farrall, et al., in J. Org. Chem., 1976, 41, 3877.

Since lithium reacts with carbon-halogen bonds, the presence of carbon-halogen bonds and double or triple bonds (that add bromine) in the polymer matrix are to be avoided.

Of the phosphiniting agents employed, the use of the phosphonochloridous esters, Ar'PCl(OR), wherein Ar' is substituted with heteroatom-containing electron donating groups such as alkoxy or N,N-dialkylamino, resulted in 50–100% of the phosphorus that was incorporated into the polymer being in the desired phosphinite form and is preferred. Solely for economic reasons, ethyl p-anisylphosphonochloridite is most preferred. Of course, other electron-donating groups in addition to para-methoxy may also be used. Phosphonites having formula Ar'P(OR)$_2$, gave polymer having large amounts of P(V) and their use is to be avoided. Phosphonous dichlorides (Ar'PCl$_2$, ) were found to be too reactive and produced large amounts of tertiary phosphines from reaction with two different lithiated phenyl groups. Since tertiary phosphines catalyze dimerization of acrylonitrile with predominate formation of the branched-chain dimer, methyleneglutaronitrile, the use of phosphonous dichlorides is to be avoided.

The reaction of the lithiated polymer with excess phosphiniting agent, preferably phosphonochloridous esters, was performed at 0° C. or less, e.g., −78° C. and the reaction mixture was allowed to warm to room temperature, with stirring. The polymeric substance formed was washed repeatedly with toluene, tetrahydrofuran (THF) and a THF-isopropanol mixture to remove all traces of lithium cations and bases which interfere with the ACN dimerization process.

In another preferred aspect of the present invention schemetically illustrated in FIG. 4, the polymer-bound alkyl diarylphosphinite catalyst having formula I was prepared by contacting a polymer containing an aromatic group as described hereinabove with PX$_3$, and an effective amount of a Friedel-Crafts catalyst selected from the group consisting of TiX$_4$, ZrX$_4$, BX$_3$, SbX$_5$, SnX$_4$ and AlX$_3$, wherein X is halogen, preferably Cl, preferably PCl$_3$ and AlCl$_3$ under substantially anhydrous conditions for a time sufficient to produce a polymer containing aromatic groups at least about 1%, preferably at least about 5 to a maximum of 100% of which are substituted with $PX_2$, preferably $PCl_2$, groups.

The polymer-bound phosphorus dichloride is then carefully purified, e.g., by copious washing with an aprotic ether such as THF for a time sufficient to remove metal-containing (e.g., aluminium-containing) species that would interfere with the next step. The polymer containing the aromatic groups highly substituted with $PCl_2$, groups is then contacted with an aromatic compound Ar'H having the formula and structure described above as Formula C, in the presence of an effective amount of a Friedel-Crafts catalyst (defined hereinabove) for a time sufficient to produce a polymer having the formula $\text{\textcircled{p}}—C_6H_4—P(Ar')Cl$.

The $\text{\textcircled{p}}—C_6H_4—P(Ar')Cl$ is contacted with a straight or branched chain alkanol or cycloalkanol, preferably ethanol or 2-propanol in the presence of a base, preferably pyridine for a time sufficient to produce a polymer having the formula $\text{\textcircled{p}}—C_6H_4—P(Ar')OR$, wherein R is alkyl having 1 to 10 carbons or cycloalkyl having 5 to 10 carbons.

Figure 4:
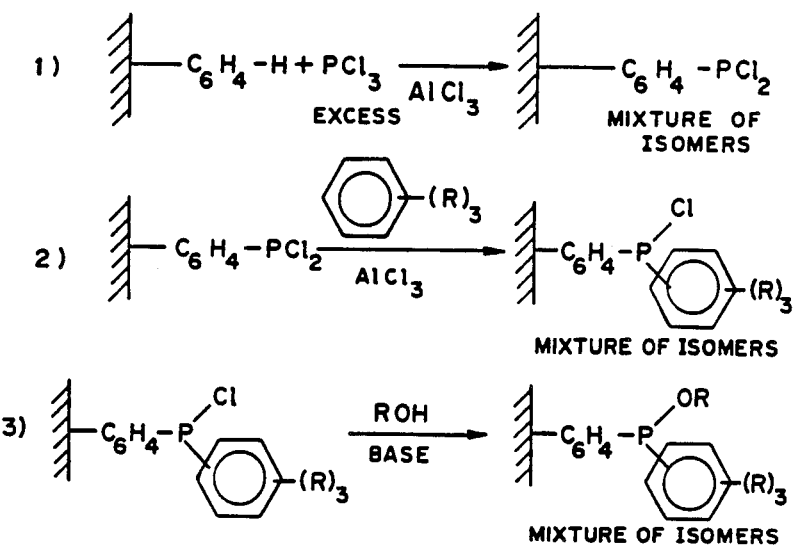
FIG. 4 schematically illustrates one synthetic pathway for preparation of a polymer-bound alkyl diarylphosphinite catalyst of the present invention.

The yield and catalytic activity (especially service lifetime) of polymer-bound alkyl diarylphosphinite obtained in the esterification step of FIG. 4 is deleteriously effected by the presence of a Friedel-Crafts catalyst absorbed in the polymer-bound phosphinous chloride recovered from the previous step. To maximize the yield and catalytic activity of polymer-bound alkyl diarylphosphinite, it was found necessary, prior to the esterification step, to effect removal of Friedel-Crafts catalyst, e.g., $AlCl_3$, from polymer-bound phosphinous chloride by hydrolysis of the phosphinous chloride to the phosphine oxide such as by repeated washings with polar solvents such as $H_2O$/THF. To achieve full activity of polymer-bound alkyl diarylphosphinite catalyst prepared via Friedel-Crafts scheme illustrated in FIG. 4, it is advisable to remove the Friedel-Crafts catalyst, e.g., $AlCl_3$, as fully as possible. The polymer-bound phosphine oxide was thereafter regenerated with $PX_3$ conveniently with $PCl_3$ to produce the polymer-bound phosphinous chloride which was then converted to the polymer-bound phosphinite.

During the course of development of the synthetic scheme illustrated in FIG. 4, there was found an article by D. D. Whitehurst in CHEMTECH, 1980, 44, wherein a scheme is disclosed suggesting that phosphinous chloride bound to polystyrene may be formed by the reaction of polystyrene with $C_6H_5PCl_2$ catalyzed by $AlCl_3$. However, in our hands, the reaction of 3,4,5-$(CH_3)_3C_6H_2PCl_2$ with polystyrene in the presence of $AlCl_3$ at 60° C. failed to produce any polystyrene-bound arylphosphinous chloride. (See Example 17a.) When the reaction of 3,4,5-$(CH_3)_3C_6H_2PCl_2$ with polystyrene was conducted in the presence of $AlCl_3$ at 100° C., there was obtained a yellow-orange gummy solid that was contacted with isopropanol in the presence of pyridine; the reaction product was shown to contain no phosphinite phosphorus by $^{31}P$ NMR analysis. (See Examples 17b–c).

Among the aromatic compounds having the formula Ar'H found useful in the present invention are toluene, xylenes, e.g., o- or m-xylene, trialkylbenzenes such as 1,2,3-, 1,3,4-, and 1,2,4-trialkylbenzene wherein alkyl is a linear or branched chain group having 1 to 10 carbons and tetralin. Trimethylbenzenes and xylenes are preferred. For economic reasons, xylenes, especially o-xylene are more preferred. Aromatic compounds containing groups such as alkoxy that react with Friedel-Crafts catalyst are to be avoided.

The preferred polymer-bound catalysts having the general formula I is $\text{\textcircled{p}}—C_6H_4—P[(CH_3)_2C_6H_3]—O—i—C_3H_7$ wherein $\text{\textcircled{p}}—C_6H_4—$ is derived from a polymer which comprises polystyrene ($\text{\textcircled{p}}—C_6H_5$) and preferably, consists essentially of polystyrene cross-linked with about 1–40% by weight of divinylbenzene and in the form of micro- or macroreticular beads or cluster of beads.

The polymer-bound alkyl diarylphosphinite of the present invention has demonstrated long-term stability. For example when the dimerization of acrylonitrile was effected continuously over 184 hours using a flow reactor packed with a preferred embodiment of the polymer-bound catalyst having the formula I, prepared in accordance with the synthetic pathway illustrated in FIG. 5, wherein R is ethyl or isopropyl and Ar' is p $—CH_3OC_6H_4—$, i.e., with $\text{\textcircled{p}}—C_6H_4—P—(p—CH_3OC_6H_4—)O—C_2H_5$ or $\text{\textcircled{p}}—C_6H_4—P(p—CH_3OC_6H_4—)O—i—C_3H_7$, the percent conversion slowly declined from 63% initially to 40% at 184 hours. The percent selectivity to linear and branched dimers was 90–91% (92% linear, 8% branched).

When the dimerization of acrylonitrile was effected continuously over 216 hours using a flow reactor packed with another preferred embodiment of the polymer-bound catalyst having the formula I; prepared in accordance with the synthetic pathway illustrated in FIG. 4, wherein R is isopropyl and Ar' is $—C_6H_3(CH_3)_2$, i.e., with $\text{\textcircled{p}}—C_6H_4—P—(C_6H_3(CH_3)_2)O—i—C_3H_7$, the percent conversion was nearly constant at 62% for the first 104 hours, declined slowly to 49% for the next 81 hours (185 hours total run time); the flow rate was then doubled. The faster flow rate determined the contact time, and that resulted in a lower conversion of 29%. With time the conversion dropped to 24% after 25 hours (210 hours, total run time) at this flow rate. At this point, the flow rate was increased by an additional 33% and the conversion, dropped to 20%. The run was finally stopped at 216 hours (total run time) and the conversion was 16% at a flow rate of about three times the initial flow rate. The percent selectivity to linear and branched dimers was 92% for the entire 216 hour run time (93% linear, 7% branched).

In contradistinction, trimethylsilyl dibutylphosphinite, a soluble phosphinite having a P—O—Si bond and serving as a model compound for the phosphinites bound to silica such as disclosed in U.S. Pat. Nos. 4,059,542 and 4,089,890, was prepared (see Example 18) and was tested as an ACN dimerization catalyst (see Example 19) but was found completely inactive and was, in a relatively short time (3 hours), in the ACN dimerization medium, converted into a catalytically inactive phosphorus (V) species. Partially phosphinited derivatives of polyvinyl alcohol and of various hydroxyl-containing polymers were prepared and showed little or no activity as ACN dimerization catalysts, in agreement with the results of other studies conducted with 1,2- and 1,3-diols, which are not reported in the experimental section hereinbelow (see Comparative Example 28 and Table V). Fully phosphinited derivatives of hydroxyl-containing polymers required addition of proton donors, e.g., isopropanol or neopentyl alcohol, to the ACN dimerization medium. The presence of such proton donors caused solvolysis of the polymer-bound phosphinites and the formation of soluble monomeric phosphinites (see Table V for a summary of these results).

Phosphinite bound to polyvinyl alcohol (PVA), PVA cross-linked with TDI and similar OH-containing polymers such as 4-(2-hydroxypropyl)polystyrene and "TOYOPEARL", a trade name for a cross-linked PVA copolymer containing aliphatic hydroxy and non-hydroxyl oxygen moieties were found to be impractical or ineffective catalysts for ACN dimerization.

Figure 2:
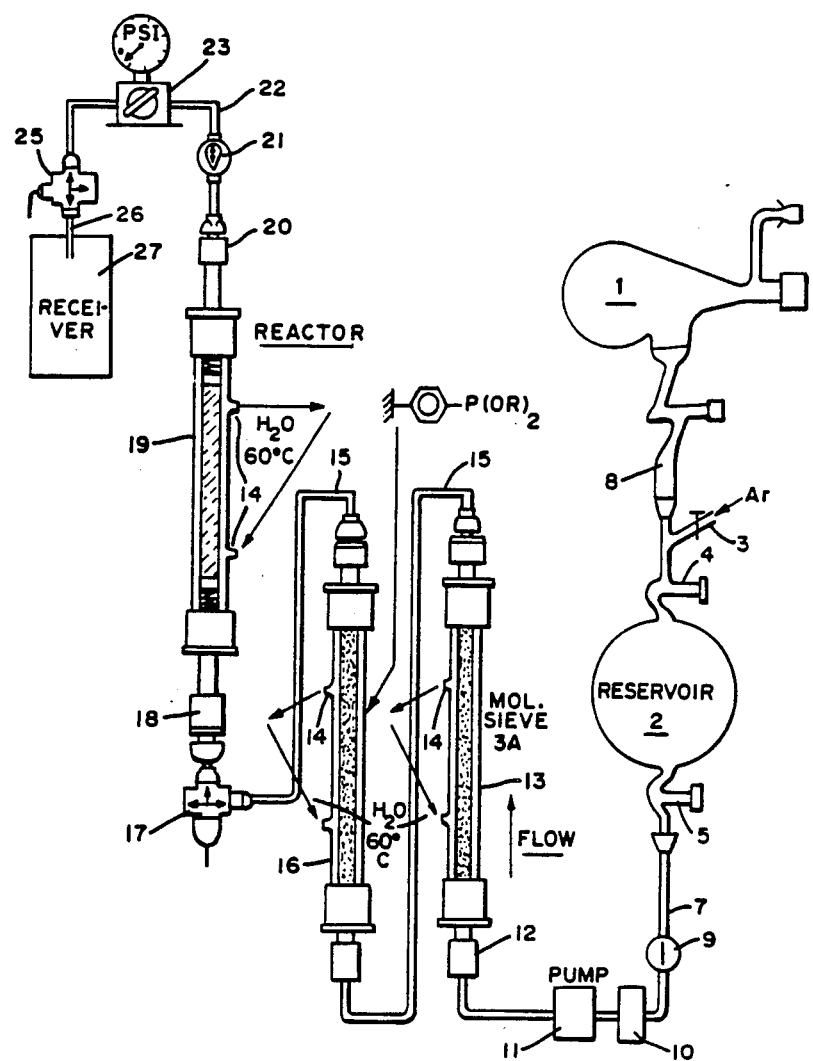
FIG. 2 schematically illustrates operation of the polymer-bound phosphinite catalyst of the present invention in a flow reactor.

The polymer-bound dialkyl arylphosphonite used as a drying agent in the present invention is conveniently contained in a fixed bed, i.e., a column positioned before the polymerbound phosphinite catalyst as illustrated in FIG. 2. The polymer-bound dialkyl arylphosphonite may be prepared by the scheme illustrated in FIG. 8 and recycled, i.e., reconverted to phosphonite by the scheme illustrated in FIG. 6.

Figure 8:
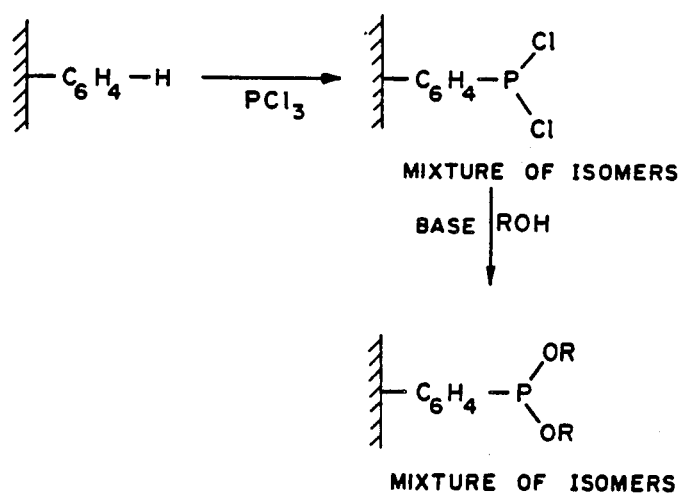
FIG. 8 schematically illustrates a preferred method of preparation of the polymer-bound dialkyl phosphonite of the present invention.

Surprisingly it was discovered that the polymer-bound dialkyl arylphosphonites prepared in accordance with the synthetic scheme illustrated in FIG. 8 contained residual metal-containing (e.g. aluminium-containing) species which limited their service lifetime and usefulness as drying agents. Thus, when a polystyrene-bound diisopropyl phosphonite was used as a drying agent in a acrylonitrile dimerization reaction in the presence of an active polystyrene-bound phosphinite [(P)—$C_6H_4$—P($C_6H_3(CH_3)_2$)O—$C_3H_7$], the phosphinite was rapidly deactivated.

Unfortunately, in contradistinction to the solution to problem associated with the polymer-bound aryl phosphinous chloride schematically illustrated in steps 3-5 of FIG. 4, hydrolysis of the polymer-bound phosphonous dichloride, regeneration of the dichloride with $PCl_3$ and subsequent esterfication did not effectively solve the problem. Surprisingly, this problem was solved and a more active dialkyl phosphonite drying agent that effectively prolonged the catalytic serivce lifetime of the polymer-bound alkyl diarylphosphinite was prepared using the scheme outlined in FIG. 8 by hydrolyzing the diisopropyl phosphonite with aqueous THF containing HCl, regenerating the dichloride with $PCl_3$ and esterifying the phosphonous dichloride so formed with alcohol in the presence of a base, e.g., pyridine.

GENERAL EXPERIMENTAL

Infrared spectra, as either neat films or KBr pellets, were recorded on a Perkin-Elmer 283 Spectrophotometer. Proton, $^{13}C$ and $^{31}P$ NMR were recorded on Varian T-60, FT-80A, and XL-200 instruments. Phosphorus chemical shifts are reported relative to external 85% phosphoric acid. Gas chromatographic analyses were performed on a Hewlett Packard 5710 using a 3'×⅛" Porapak P column and a Hewlett Packard 3352B computer to monitor the retention times and peak areas.

All dimerization runs and the preparation of the polymer-bound catalysts were carried out with the careful exclusion of oxygen and moisture. Transfer of moisture-sensitive solids was carried out in a Vacuum Atmospheres Dry Box. Volatile liquids were transferred on a vacuum line, while the nonvolatile, soluble catalysts were transferred via syringe in a stream of argon.

Materials

All solvents were reagent grade. Toluene and cyclohexane were stored over sodium-potassium alloy under vacuum. Tetrahydrofuran (THF) was stirred with lithium aluminum hydride, then distilled into a solvent reservoir containing sodium-potassium alloy and anthracene. The THF was distilled from the solution of the blue radical anion as needed. Isopropanol, tert-butyl alcohol and acrylonitrile were refluxed over calcium hydride (approximately 40 mesh) for at least three hours, then distilled onto flame-dried 4A molecular sieves for storage. Neopentyl alcohol was sublimed onto flamed-dried 4A molecular sieves. After standing overnight, these reagents were sampled for water content (Karl Fisher) and found to contain <30 ppm of water. Samples were taken periodically to assure that the water content remained low, i.e., less than 50 ppm. Pyridine was also dried over clacium hydride and distilled onto molecular sieves.

"TOYOPEARL ® 55", the trade name for a polyvinyl alcohol cross-linked copolymer containing aliphatic tydroxy and non-hydroxy oxygen moieties, was obtained in the form of beads as a water slurry in superfine (20-30 μm) and coarse (50-100 μm) grades from MCB, and was washed repeatedly with water and with acetone, then dried in vacuo at 100° C. for at least 24 hrs. Polyvinyl alcohol (88% hydrolyzed, avg MW 10,000) was obtained from Aldrich. Ethylene/vinyl alcohol copolymer (40/60) type F was purchased from Kuraray Co., Ltd. Polyvinyl alcohol cross-linked with terephthalaldehyde and with tolylene diisocyanate were prepared as described by G. Manecke et al. in Makromolekurare Chem., 117, 725 (1976) and by S. Nozakura et al. in J. Polymer Sci., A, 10, 22767 (1972).

EXAMPLE 1

Preparation of Di-p-tolylphosphinites

Ethyl and isopropyl di-p-tolylphosphinites were prepared following the procedure of Coezens, et al., as disclosed in U.S. Pat. No. 4,238,422 at Col. 8, lines 19-59, by the reaction of ethyl or isopropyl phosphonodichloridite with p-tolylmagnesium bromide in THF. After treatment with pyridine to precipitate the magnesium halide complex, the product was purified by Kugelrohr distillation at 120°-125° C. (0.1 mmHg). Ethyl di-p-tolylphosphinite was also prepared from di-p-tolylphosphinous chloride by the procedure described in the following entry. IR (neat) 1600, 1498, 1385, 1090, 1045, 817, 520 cm$^{-1}$; $^1$H NMR (CDCl$_3$) δ 7.6-7.0 (m, 8 H), 3.9 (m, 2 H), 2.32 (s, 6 H), 1.28 (t, 3 H).

EXAMPLE 2

Preparation of Ethyl Diphenylphosphinite

A solution of diphenylphosphinous chloride (135 mmol) in dry ether (120 mL) was treated dropwise at 5° C. with a solution of ethanol (200 mmol) and pyridine (134 mmol) in ether (120 mL). After addition was complete, the mixture was warmed to room temperature, filtered under argon, and the solid hydrochloride washed with ether. Evaporation of the solvent gave an oil which was purified by Kugelrohr distillation at 95° C. (0.1 mmHg). Yield: 119 mmol (88%); $^1$H NMR (CDCl$_3$) δ 7.6-7.2 (m, 10 H), 3.95 (doublet of quartets, $J_{H-H}$=7 Hz, $J_{P-H}$=10 Hz, 2 H), 1.30 (t, J=7 Hz, 3 H).

EXAMPLE 3 p-Anisylphosphonous Dichloride and Diisopropyl p-Anisylphosphonite

The phosphonous dichloride was prepared by the stannous chloride-catalyzed Friedel-Crafts Crafts reaction of phosphorus trichloride (three-fold excess) and anisole following the procedure of Miles and co-workers (J. Org. Chem., 1975, 40, 343). IR (neat) 1590, 1500, 1295, 1255, 1180, 1095, 1030, 830 cm$^{-1}$; $^1$H NMR (CDCl$_3$) δ 8 8.0–7.6 (broad t, 2 H), 7.1–6.8 (broad d, 2 H), 3.83 (s, 3 H). The dichloride (26 mmol) was treated in dry ether with isopropanol (62 mmol) and dimethylaniline (48 mmol) at 0° C. Workup and Kugelrohr distillation at 105°–110 ° C. (0.05 mmHg) afforded a 53% yield of the phosphonite. IR (neat 1590, 1498, 1245, 0100, 955, 860, 750 cm$^{-1}$; $^1$H NMR (CDCl$_3$) δ 7.7–7.4 (m 2 H), 7.1–6.8 (m, 2 H), 4.3 (m, 2 H), 3.78 (s, 3 H), 1.25 (d, J=6 Hz, 6 H), 1.20 (d, J=6 Hz, 6 H). The corresponding diethyl ester was prepared in 85% yield using this procedure, but with pyridine as the base instead of dimethylaniline.

EXAMPLE 4

Ethyl p-Anisylphosphonochloridite

This and other phosphonochloridous esters were best prepared by the procedure of Steininger (Chem. Ber., 1962, 95, 2993) for the comproportionation of the corresponding phosphonous dichloride and phosphonite. Thus, a solution of diethyl p-anisylphosphonite (7.5 g, 36 mmol) in dry ether (20 mL) was added to a solution of p-anisylphosphonous dichloride (8.2 g, 36 mmol) in ether (75 mL) at 5° C. The solution was warmed to room temperature and stirred two hours, then concentrated and distilled (Kugelrohr) at 105°–110° C. (0.1 mmHg). Yield: 9.4 g (60%); IR (neat) 1595, 1500, 1255, 1095, 1025, 930, 824 cm$^{-1}$; $^1$H NMR (CDCL$_3$) δ 7.9–7.5 (n, 2 H), 8.1–7.8 (m, 2 H), 4.0 (m, 2 H), 3.82, (s, 3 H), 1.30 (t, J=7 Hz, 3 H); −P NMR (CDCl$_3$) δ 177.2 (ca. 90%).

EXAMPLE 5

Ethyl Diphenylphosphinite

A solution of phenylphosphonous dichloride (66 g, 0.37 mol) in dry ether (100 mL) was treated dropwise with a solution of ethanol (21.6 mL, 0.37 mol) and pyridine (29.6 mL) was added slowly. The reaction mixture was filtered, washed with ether, and the ether evaporated to give an oil. The oil was distilled in the Kugelrohr and then through a short Vigreux column at 95°–98° C. (0.05 mmHg); lit. (T. L. Emmick et al., J. Am. Chem. Soc., 1968, 90, 3459) 102103° C. (0.2 mmHg). Yield 44.3 g (70%). $^1$H NMR (CDCl$_3$) δ 7.57 (d, J=569 Hz, 1 H), 8.0–7.4 (m, 5 H), 4.13 (2 q, J$_{H-H}$=7 Hz, J$_{P-H}$=14 Hz, 2 H), 1.35 (t, J=7 Hz, 3 H).

EXAMPLE 6 p-Tolylphenylphosphine oxide

A solution of p-tolylmagnesium bromide [prepared from p-bromotolueme (29.1 g, 0.16 mol) and magnesium (4.38 g, 0.18 g-atom)] in ether (100 mL) was treated with a solution of ethyl phenylphosphonite (13,6 g, 0.08 mol) in ether (50 mL) with vigorous mechanical stirring. The mixture was heated at reflux for ½ hr., then 100 mL of 25% sulfuric acid was added cautiously. Three layers formed; the bottom (aqueous) layer was extracted with toluene. Addition of NaHCO$_3$, to the combined upper layers produced a vigorous reaction and a single organic phase. The organic phase was washed with water and with saturated NaCl, dried and evaporated to give an oil (14 g). Kugelrohr distillation at 120°–160° C. (0.1 mmHg) followed by chromatography on silica gel (CHCl$_3$), then 10% MeOH-CHCl$_3$) gave 7.1 g of an oil. This was distilled in the Kugelrohr again (150° C., 0.1 mmHg) to give 6.2 g of product which appears to be pure by NMR and crystallized on standing. $^1$H NMR (CDCl$_3$) δ 8.0–7.2 (m, 9 H), 8.08 (d, J=480 Hz, 1 H), 2.42 (s, 3 H).

EXAMPLE 7

Preparation of Phosphinited Polystyrene

Figure 1B:
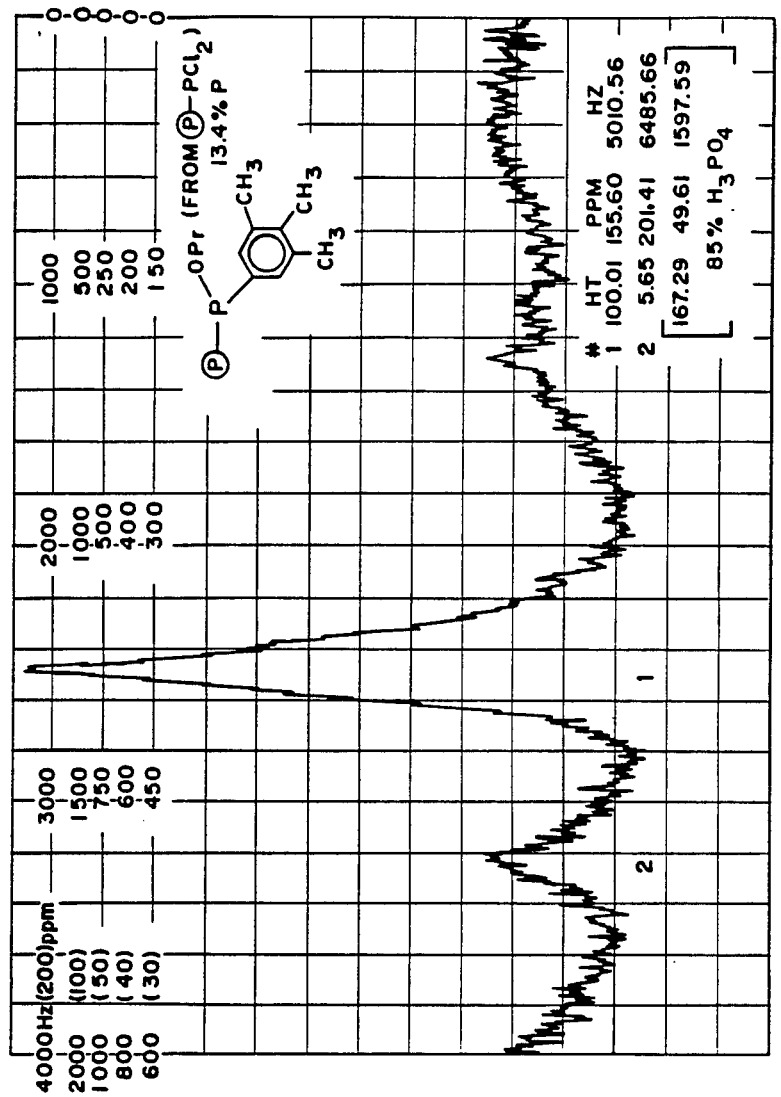

A previously prepared sample of brominated polystyrene beads (Bio-Beads S-Xl, 200-400 mesh) containing 17.1% bromine (27% of the rings) was used in most of the preparations. See S. E. Jacobson, et al. JACS, (1979) 101, 6938 which is hereby incorporated by reference. The polymer (3.0 g, 6.4 meq Br ) was placed in an H-reactor and degassed. Into the other arm of the reactor was syringed a three-fold excess of n-butyl lithium and hexane under a stream of argon. This was concentrated on the vacuum line to about 3 mL, then about 20 mL of dry toluene was distilled onto the butyl lithium and about 10 mL of toluene onto the polymer. The n-butyl lithium solution was then filtered onto the polymer at −78° C., the mixture warmed to room temperature and then heated in an oil bath at 60° C. for 3 hrs. The suspension was then filtered through the glass frit in the H-reactor and part of the toluene was redistilled back onto the side of the polymer. After filtering again, the toluene was poured off under a stream of argon, then fresh toluene was distilled into the arm containing the polymer. The mixture was stirred briefly, then filtered, and the toluene poured out under Argon. Fresh toluene (25 mL) was again distilled onto the polymer, the mixture cooled to 0° C., then treated via syringe with the phosphiniting agent (2–3 equivalents), warmed to room temperature, and stirred for one hour. The mixture was filtered and some of the toluene distilled back onto the polymer. This was stirred briefly and filtered again, then the toluene was poured off under Argon. The polymer was then washed repeatedly with THF and with THF/isopropanol (1/1) in order to remove all traces of base, lithium chloride and unreacted phosphorus reagent. Inadequate washing of the polymer leads to formation of Michael adducts of acrylonitrile and alcohol in the dimerization runs. A typical analysis of the phosphinited polystyrene from a preparation using p-CH$_3$OC$_6$H$_4$P(Cl)OEt as phosphiniting agent was: C, 83.2; H, 7.90; P, 4.32; Br, 0.11. Calculated for complete replacement of bromine with p-CH$_3$OC$_6$H$_4$P(OEt): C, 81.0; H, 8.09; P, 5.3. A$^{31}$P NMR spectrum from one of the better preparations is shown in FIG. 1a. The large broad peak in the 100–120 ppm region (relative to 85% H$_3$PO$_4$) is due to phosphinite phosphorus, by comparison to soluble reference samples. The peak at −18 ppm is due to tertiary phosphine, while the two peaks in the 20–40 ppm range are due to P(V) compounds, presumably tertiary phosphine oxide (Arbuzov rearrangement product) and perhaps phosphinate or secondary phosphine oxide. The other peaks are of unknown origin. Samples prepared using phosphonous dichlorides as the phosphiniting agent showed much larger tertiary phosphine peaks, while those prepared using phosphonites as the phosphorus reagent had very large peaks in the P(V) region.

EXAMPLE 8

Dimerization Runs

In a typical dimerization run, hexamethylbenzene, an internal standard, (800 mg, 4.93 mmol) was accurately weighted and placed in a thick-walled glass reaction vessel. To this, ca. 0.37 mmol of catalyst (monomer or polymer) listed in Table I was added and degassed on a vacuum line. Next, the following dry reagents were distilled in on a vacuum line: 1 mL of isopropanol, 3 mL of acrylonitrile, and 9 mL of toluene. Approximately 1 mL of dry cyclohexane was accurately weighted into a specially designed vessel, then transferred on the vacuum line to the reaction vessel by means of a small U-shaped tube designed to minimize the distillation path and thus facilitate accurate transfer of the internal standard. The solution was then sampled under a stream of argon so that a gas chromatogram of the starting mixture could be obtained. The reaction vessel was sealed with a high vacuum stopcock and placed in an oil bath at 60° C. At varying intervals, the reactor was removed from the bath, cooled to room temperature, and sampled under a stream of argon.

Gas chromatographic analyses were performed using the Porapak P column and a temperature program starting at 60° C., increasing at 8° C./min. for 4 min., then at 32° C./min. to 240° C. and holding for 4 min. Reference standards were prepared using cyclohexane and hexamethylbenzene as internal standards. Cyclohexane was used to calculate acrylonitrile concentration and the hexamethylbenzene was used for measuring the concentrations of methyleneglutaronitrile and the cis- and trans-1,4-dicyano-1-butene products.

By the term "% selectivity", as used herein, is meant the % by weight of acrylonitrile (ACN) that is converted to total linear/branched dimeric, oligomeric and polymeric products. By the term "% selectivity ", as used herein, is meant the % by moles of acrylonitrile converted into linear dimers, i.e., cis- and trans-1,4-dicyanol-butene (DCB-1). Thus, % selectivity is defined as twice the number of moles of DCB-1 divided by moles of reacted acrylonitrile multiplied by 100%.

EXAMPLE 9

Long-term Stability of Ethyl Di-p-tolylphosphinite

This experiment was run in the same way as described in Example 8, but a larger amount of all of the reactants was employed, except for the catalyst, Tolyl$_2$POEt. In this case, 30 mg of catalyst was used with 6 g of hexamethylbenzene, 6.7 mL of isopropanol, 7 mL of cyclohexane, 60 mL of toluene and 20 mL of acrylonitrile. A sample of this solution was sealed in an NMR tube under argon and heated together with the pressure tube at 60° C. At intervals the pressure tube was removed from the oil bath and sampled in the usual way. At the same time, the NMR tube was removed. Analysis by $^{31}$P NMR showed all of the phosphorus in the pressure tube had been converted to P(V) after the dimerization has proceeded for 127 hours, due to repeated openings of the tube, whereas most of the phosphorus in the NMR tube had remained in the form of P(III). The results are summarized in Table II.

EXAMPLE 10

Long-term Stability of Phosphinited Polystyrene

Attempts to run the dimerization in an H-reactor using the polymeric catalyst, ethyl p-methoxyphenylphosphinited polystyrene, filtering off the reaction solution, drying the polymer, and reusing it resulted in a rapid decline in the performance of the catalysts from one run to the next. This may be due to a number of factors, especially concentration of the dimers and oligomers in the presence of the catalyst. To avoid this problem, the dimerization was run in the same way as described in Example 8 with the soluble catalyst. Thus, 400 mg of phosphinited polystyrene was combined in a solvent reservoir with 6 g of hexamethylbenzene, 6.7 mL of isopropanol, 7 mL of cyclohexane, 60 mL of toluene and 20 mL of acrylonitrile, heated at 60° C. and sampled at intervals. At the end of the experiment, the polymer was recovered and analyzed by $^{31}$P NMR spectroscopy: all of the phosphorus had been converted to P(V) apparently due to repeated openings of the tube. The results are summarized in Table III.

TABLE I

Dimerization of Acrylonitrile to 1,4-Dicyano-1-butene[a]

| Catalyst | Time (Hr) | % Conv. | % Sel.[f] |
|---|---|---|---|
| (p-Tolyl)$_2$PO—i-Pr[b] | 3 | 28 | 85 |
|  | 21 | 85 | 75 |
| Ph$_2$POEt[b] | 3 | 9[e] | 80[e] |
|  | 26 | 49 | 81 |
|  | 72 | 81 | 76 |
| (p-Tolyl)$_2$POEt[b] | 3 | 36 | 96 |
|  | 24 | 89[e] | 91 |
| (p-Tolyl)$_2$POEt[b] | 3 | 25 | 88 |
|  | 24 | 87[e] | 99[e] |
| P*—C$_6$H$_4$—P(—O—i-Pr)(C$_6$H$_4$OCH$_3$)[c] | 3 | 23 | 68 |
|  | 24 | 77 | 75 |
| P*—C$_6$H$_4$—POEt(C$_6$H$_4$OCH$_3$)[c] | 3 | 24 | 80 |
|  | 24 | 80 | 76 |
| P*—C$_6$H$_4$—POEt(C$_6$H$_4$OCH$_3$)[c] | 3 | 17[e] | 80[e] |
|  | 24 | 68 | 88 |
| P*—C$_6$H$_4$—POEt(C$_6$H$_4$OCH$_3$)[d] | 3 | 46 | 89 |
|  | 6 | 65 | 88 |
|  | 12 | 82 | 85 |
| P*—C$_6$H$_4$—POEt(C$_6$H$_4$OCH$_3$)[d] | 3 | 58 | 98 |

Footnotes to Table I
[a]Conditions: 800 mg of hexamethylbenzene, 1 mL of cyclohexane, 3 mL of acrylonitrile, 9 mL of toluene, 1 mL of i-PrOH, T = 60° C., P = 1.5 atm
[b]100 μ
[c]200 mg.
[d]500 mg.
[e]Results at low or high conversion are approximate due to uncertainty in integration of the G.C. peaks.
[f]Selectivity represents the yield of cis- and trans- 1,4-dicyano-1-butene based on acrylonitrile consumed.
*Polystyrene cross-linked with 1 wt % divinylbenzene

TABLE II

Stability of Ethyl Di-p-Tolylphosphinite[a]

| Time (Hrs) | % Conv. | % Selec.[b] | % P(III) |
|---|---|---|---|
| 0 | — | — | 83 |
| 13 | 35 | 94 | 82 |
| 21 | 48 | 97 | 82 |
| 35 | 64 | 98 | 79 |
| 43 | 67 | 91 | — |
| 57 | 72 | 92 | 76 |

TABLE II-continued

Stability of Ethyl Di-p-Tolylphosphinite[a]

| Time (Hrs) | % Conv. | % Selec.[b] | % P(III) |
|---|---|---|---|
| 127 | 68 | 92 | 63 |

[a]Conditions: 0.24 mmol of catalyst, 6.0 g of hexamethylbenzene, 7 mL of cyclohexane, 20 mL of acrylonitrile, 6.7 mL of isopropanol, 60 mL of toluene, 60° C. in a sealed NMR tube.
[b]Selectivity represents the yield of cis- and trans-1-4-dicyano-1-butene based on acrylonitrile consumed.

TABLE III

Stability of Phosphinited Polystyrene[a]

| Time (Hrs) | % Conv. | % Selec.[b] |
|---|---|---|
| 19 | 20 | 67 |
| 26 | 26 | 62 |
| 44 | 36 | 62 |
| 67 | 43 | 58 |
| 91 | 47 | 53 |

[a]Conditions: 400 mg catalyst:

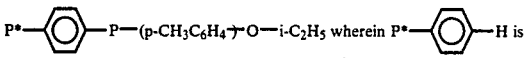

P*—⟨◯⟩—P—(p-CH$_3$C$_6$H$_4$)—O—i-C$_2$H$_5$ wherein P*—⟨◯⟩—H is polystyrene crosslinked with 1 weight % divinylbenzene, 6.0 g of hexamethylbenzene, 7 mL of cyclohexane, 20 mL of acrylonitrile, 6.7 mL of isopropanol, 60 mL of toluene, 60° C.
[b]Selectivity represents the yield of cis- and trans- 1,4-dicyano-1-butene based on acrylonitrile consumed.

EXAMPLE 11

Acrylonitrile Dimerization using Flow Reactor

This Example was run in the apparatus illustrated in FIG. 2. A flow reactor was assembled using two 0.9×30 cm glass, water-jacketed HPLC columns 13, 19, a piston-type HPLC pump 11 and a reservoir 2 fitted with stopcocks 4, 5 and a side arm 3 to allow addition of reagents with the exclusion of atmospheric oxygen and moisture. The exit of the second column 19 was attached to a pressure gauge 23, a three-way stopcock 25 and a graduated receiver 27. The inlet tube 26 to the receiver 27 was attached via a side arm to a mercury bubbler (not shown) which allowed application of 30 cm Hg pressure to the system. At least 20 cm Hg pressure is necessary to prevent bubble formation in the reactor column 19 and drying columns 13 and 16.

The two columns were fitted with adjustable plungers and stopcocks at each end. A three-way stopcock 17 was used at the bottom (inlet) end of the column 19 holding the catalyst resin. The two columns were dried at 150° C., then placed while still hot in the port of a dry box. In the dry box, one column 13 was charged with 10 g of 16 mm pellets of 3A molecular sieves which had been activated at 200° C. while being evacuated on a vacuum line, then allowed to cool under dry argon. The second column 19 was charged with 2.0 g (2.9 mmol of phosphorus) of the polystyrene catalyst bearing ethyl p-methoxyphenylphosphinite previously described in Example 10. Both columns were closed and removed from the dry box, then attached to the remainder of the system. Column 16 was not used in this experiment.

The solvent reservoir was filled, under argon, with a degassed and dry solvent mixture of diisopropyl phenylphosphonite (20 μL), toluene (50 mL) and isopropanol (5 mL).

The solvent mixture was pumped through the columns at a rate of 22 mL/hr. until all bubbles of argon had been removed, then the water circulating bath was turned on, the system pressurized to 30 cm Hg and the temperature of the columns 13, 19 raised to 60° C. The catalyst resin had swollen to about 13 mL volume.

In a specially designed reagent vessel 1, was placed 150 μL diisopropyl phenylphosphonite. The flask was attached to a vacuum line and the following dry reagents distilled in: toluene (270 mL), isopropanol (27 mL), cyclohexane (20.6 g, 26 mL) and acrylonitrile (67.8 g, 84 mL).

Vessel 1 was filled with argon, warmed to room temperature and the reagents thoroughly mixed. Vessel 1 was then attached to reservoir 2 via the sidearm 8 which was repeatedly evacuated and filled with argon. The reservoir 2 was evacuated and the contents of flask B transferred to it by opening the stopcock 9 above the filter 10. Pumping speed was adjusted to 7.8 mL/hr and this point was designated as time 0 hr.

The effluent from the reactor was collected in 125 mL graduated receivers 27 which were changed periodically at intervals of 10-13 hrs. Evaporation of each of these samples at 35° C. (1 mm Hg) left an oil which consisted of the acrylonitrile dimers and higher oligomers. The samples were further analyzed by gas chromatography and by Kugelrohr distillation of the dimers [linear and branched at 80°-100° C. (0.1 mm Hg)]. Percent selectivities to dimers (see Table IV) were 90-91% a mixture of dimers (92% linear vs 8% branched dimers).

At intervals, samples of the reaction mixture were taken using the three-way stopcocks 17 and 25 before and after the catalyst bed. Gas chromatographic analysis of the amount of acrylonitrile present relative to cyclohexane allowed calculation of the percent conversion. The percent conversion slowly declined during the experiment from 63% initially to 40% at 184 hours (see FIG. 2).

Additional batches of the reagent mixture were prepared and transferred to the reservoir when needed. Percent conversions were measured for periods when the flow rate was 7.7+0.1 mL/hr.

Figure 3:
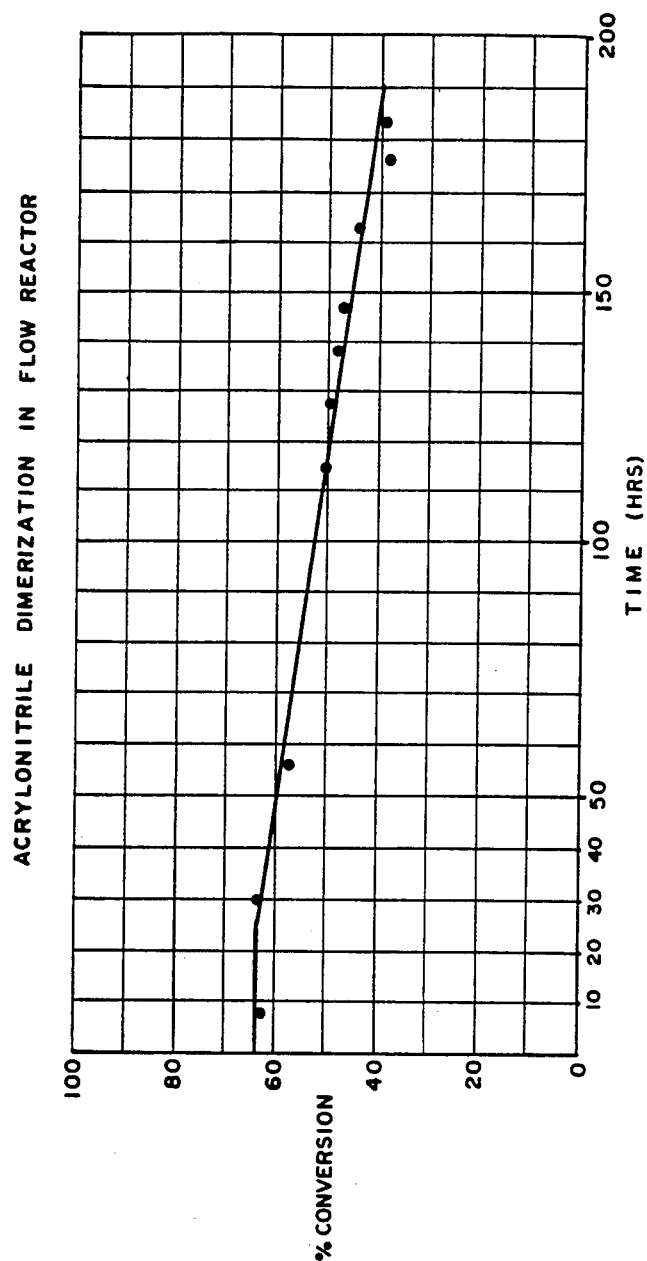
FIG. 3 graphically illustrates the variation in the percent conversion of ACN vs reaction time for the polymer-bound phosphinite catalyst prepared by the procedures of example 7 and operated as shown in FIG. 2.

At 184 hours the last reservoir of reagents had been consumed and a mixture of toluene:isopropanol (10:1) was added to purge all of the remaining reagents through the system. The combined collected fractions contained 109.64 gm of products, equivalent to 2.066 moles of acrylonitrile converted. This represents 714 catalyst turnovers. Results are summarized in Table IV and FIG. 3.

After about 30 hours of reaction, the pump had to be disconnected and a valve was changed. After replacement of the valve and reconnection of the pump, the reaction was continued but the percent conversion started to decline faster. It is believed that this interruption caused contamination of the catalyst by moisture and oxygen. It is further believed that if this interruption had not occurred and if the reagent mixture had been more effectively dried such as by use of polystyrene-bound dialkyl phosphonite (e.g., placed in column 16 as shown in FIG. 2), the decline in the activity of the catalyst as measured by the percent conversion would have been lower.

TABLE IV

| | Acrylonitrile Dimerization Products | | | | |
|---|---|---|---|---|---|
| Receiver | Vol. mL | wt g | (residue)[a] wt. g | (dimers)[b] wt. g | % Selec.[C,D] to dimers |
| 1 | 103 | 88.9 | 9.76 | 8.87 | 91 |
| 2 | 98.5 | 86.2 | 10.91 | | |
| 3 | 84.5 | 73.2 | 9.14 | | |
| 4 | 84 | 72.5 | 8.0 | 9.33 | 91 |
| 5 | 80 | 68.7 | 7.11 | | |
| 6 | 73 | 62.8 | 6.62 | | |

TABLE IV-continued

| | | Acrylonitrile Dimerization Products | | | |
|---|---|---|---|---|---|
| Receiver | Vol. mL | wt g | (residue)[a] wt. g | (dimers)[b] wt. g | % Selec.[c,d] to dimers |
| 7 | 77.5 | 67.5 | 7.01 | 6.31 | 90 |
| 8 | 80 | 68.6 | 6.86 | | |
| 9 | 98 | 84.7 | 7.79 | | |
| 10 | 80 | 67.5 | 6.01 | 5.45 | 91 |
| 11 | 91 | 78.2 | 6.82 | | |
| 12 | 73 | 62.6 | 5.32 | | |
| 13 | 94 | 80.3 | 5.22 | 5.57 | 90 |
| 14 | 94 | 80.4 | 5.97 | | |
| 15 | 120 | | 4.92 | | |
| Combined samples | | | 1.09 | | |
| Total | | | 109.64 | | |

[a] After evaporation of reagents at 35° C. (1 mm Hg)
[b] Isolated by Kugelrohr distillation at 80 = 100° C. (0.1 mm Hg).
[c] 92% 1,4-dicyano-1-butenes, 8% methyleneglutaronitrile.
[d] % Selectivity to DCB-1 = % Selec. to dimers × 92% (% DCB-1 in dimers).

EXAMPLE 12

Preparation of the polystyrene-bound phosphonous dichloride (P)—$C_6H_4$—$PCl_2$ In a typical preparation, 1 gm (9.6 mmol) polystyrene resin cross-linked with 1 weight % divinyl-benzene (Bio Beads. S-X1, 200–400 mesh) and 1.33 gm (100 mmol) anhydrous aluminum chloride ($AlCl_3$) were placed under an inert atmosphere into one side of an H-reactor, as described in Example 7, and equipped with a reflux condenser with an argon inlet; 12.5 mL (excess) of degassed $PCl_3$, were syringed, under a stream of argon, into the reactor which was then placed in an oil bath at 60° C. and stirred for 3 hours. The reaction mixture was degassed and filtered through the coarse glass frit and the filtrate poured off under argon. The polymer product was washed extensively with dry THF to remove residual $AlCl_3$ and dried in vacuo; yield: 1.7 gm, $^{31}P$ NMR (swollen in $CH_2Cl_2$) δ 162 ppm (phosphonous dichloride). Phosphorus, 13.0% by weight, was incorporated into polymer indicating that ca. 75% of the rings were functionalized.

EXAMPLE 13

Preparation of the polystyrene-bound di(isopropyl) phosphonite

One gram (4.9 mmol) of the phosphonous dichloride was charged under an inert atmosphere into an H-reactor which was then evacuated on the vacuum line. Fifteen mL of dry pyridine were distilled onto the polymer and 1.2 mL (147 mmol) of dry isopropanol were distilled into the opposite leg of the reactor. The polymer suspension was stirred at 0° C. for 1 hour while the isopropanol slowly distilled over. The mixture was warmed to room temperature and stirred an additional hour. The reaction was filtered through a glass frit, and the the filtrate was poured off under argon. The polymer was washed repeatedly with dry methylene chloride and dried in vacuo. The $^{31}P$ NMR spectrum contained a peak at 162 ppm (broad peak) indicative of phosphonite phosphorus.

EXAMPLE 14

This example illustrates the use of polystyrene-bound diisopropylphosphonite of Example 13 as a drying agent in acrylonitrile dimerization using the flow reactor of Example 11. A water-jacketed HPLC column 16 is placed in line 15 after column 13 and before the catalyst column 19 of FIG. 2. The procedure of Example 11 is followed. A lower decline in the % conversion after a longer reaction time is expected due to a more complete removal of water.

EXAMPLE 15

Preparation of polystyrene-bound 3,4,5-trimethylphenyl phosphinous chloride

One gram (4.9 mmol) of the polystyrene-bound phosphonous dichloride and 0.72 gm (5.4 mmol) of $AlCl_3$ were charged under an inert atmosphere into an H-reactor equipped with a reflux condenser with an argon inlet. Fifteen mL (excess) of 1,2,3-trimethylbenzene were syringed in under a stream of argon and suspension was stirred at 60° C. for 6 hours. The filtrate was poured off under argon, and the polymer was washed with dry THF, then with THF/pyridine in the ratio of 15/2 and dried in vacuo. The $^{31}P$ NMR spectrum contained a peak at 85 ppm (phosphinous chloride phosphorus) and a smaller peak due to dichloride at 162 ppm. In another experiment, the H-reactor was charged as described above and the suspension was stirred under a stream of argon at 100° C. for 1 h. The polymer was washed and dried as described above. The $^{31}P$ NMR spectrum indicated that ca. 95% of the phosphorus was in the form of phosphinous chloride (peak at 85 ppm) and that only ca. 5% of unreacted starting material was present (peak at 162 ppm).

EXAMPLE 16

Preparation of polystyrene-bound isopropyl 3,4,5-trimethylphenyl phosphinite

One gram of the phosphinous chloride prepared as described in Example 15 was charged into an H-reactor under an inert atmosphere and evacuated on the vacuum line. 15 mL of dry THF and 0.5 mL of dry pyridine were distilled onto the polymer and 0.5 mL (6.1 mmol) of dry isopropanol was distilled into the opposite leg. The reaction conditions of Example 13 were followed. The polymer was washed extensively with dry THF. The $^{31}P$ NMR spectrum contained a peak at 107 ppm indicative of phosphinite phosphorous (ca. 90% of P) and a smaller peak at 44 ppm (ca. 10% of P) due to an unidentified impurity. See FIG. 1b.

EXAMPLE 17a

Reaction 3,4,5—($CH_3$)—$C_3H_6PCl_2$ and Polystyrene at 60° C.

One gram (9.6 mmol) of polystyrene resin crosslinked with 1% divinylbenzene (Bio Beads, S-X1, 200-400 mesh) and 1.33 gm (10.0 mmol) of $AlCl_3$ were charged under an inert atmosphere into an H-reactor equipped with a reflux condenser and argon inlet. The polymer was swollen in 10 mL of dry 1,1,2,2-tetrachloroethane which was added (syringe) under argon. 3,4,5-$(CH_3)_3C_3H_2PCl_2$ (2.8 gm, 12.7 mmol) dissolved in 2 mL of dry 1,1,2,2-tetrachloroethane was added to reaction mixture via syringe under argon and the reaction mixture so formed was heated at 60° C. for 4 hours. The suspension was degassed and filtered through the glass frit, and the filtrate poured off under argon. The polymer was washed extensively with dry THF. The $^{31}P$ NMR spectrum showed no incorporation of phosphorus into the polymer.

EXAMPLE 17b

Reaction of 3,4,5—(CH$_3$)$_3$—C$_6$H$_2$PCl$_2$ with Polystyrene at 100° C.

The reaction described in Example 17a was repeated excepting that the reaction mixture so formed was heated at 100° C. for 2 hours. The dark brown reaction mixture produced was filtered under argon and a red-brown solid recovered and washed three times with 15 mL portions of THF. The yellow-orange solid was washed with dry CH$_2$Cl$_2$, again with THF (the color of solid remained unchanged) and dried in vacuo to give a gummy yellow-orange solid. The $^{31}$P NMR spectrum of the gummy yellow-orange solid (swollen in CH$_2$Cl$_2$) contained a large broad multiplet of unassigned peaks at 70 ppm, 51.4 ppm, 46 ppm and 36 ppm, said unassigned peaks indicative of incorporation of phosphorus into polymer and a small peak at 162 ppm indicative of a phosphonous dichloride. There was no peak at 85 ppm indicative of polymer-bound phosphinous chloride.

EXAMPLE 17c

Attempted Preparation of Polystyrene-bound isopropyl 3,4,5-trimethylphenylphosphinite The reaction product of Example 17b was treated in accordance with the apparatus and procedure of Example 16. Dry THF and removed pyridine were distilled onto ca. 700 mg of the gummy yellow-orange solid of Example 17b and by filtration. Fresh dry THF (12 mL) dry pyridine (2 mL) and dry isopropanol (2.0 mL) were distilled onto polymer. The reaction conditions and apparatus of Example 13 were then used excepting that the reaction product was washed with THF and a THF-isopropanol mixture and dried in vacuo. There was recovered 0.53 g of a yellow-orange gummy solid. The $^{31}$P NMR spectrum contained a broad multiplet of peaks centered around 30 ppm indicative of phosphorus (V). The phosphorus signal was very weak, indicating little phosphorus was incorporated and the spectrum contained no peak around 110 ppm indicating no phosphinite phosphorus was present.

EXAMPLE 18

Trimethylsilyl dibutylphosphinite

The procedure described in *Tetrahedron*, 1967, 23, 1065 (M. Grayson et al.) was followed. Dibutylphosphine oxide, prepared from butyl magnesium bromide and diethylphosphite, (3.3 g, 20 mmol) and triethylamine (2.02 g, 20 mml) were dissolved in toluene (20 mL) and treated with a solution of trimethylsilyl chloride (2.17 g, 20 mmol) in toluene (5 mL) at room temperature. The solution got very warm and a precipitate formed immediately. The mixture was heated at 80° C. for two hours, then filtered, washed with toluene, and concentrated. Kugelrohr distillation at 80° C. (1.5 mmHg) afforded 4.1 g (86%) of the desired product. $^1$H NMR (CDCl$_3$) δ 1.8–1.2 (m, 6 H), 1.1–0.7 (m, 3 H), 0.17 (s, 9 H).

EXAMPLE 19

Attempted Dimerization of ACN using Trimethylsilyl Dibutylphosphinite

A dimerization reaction mixture was prepared in accordance with the apparatus and procedure of Example 8 from cyclohexane (1 mL), isopropanol (1 mL), acrylonitrile (3 mL), toluene (9 mL), hexamethylbenzene (1.334 g) and trimethylsilyl dibutylphosphonite (0.1 mL) of Example 18. The solution was heated at 60° C. for 18 hrs, then sampled under argon. GC analysis showed no reaction products and no conversion of the acrylonitrile. Analysis of the reaction mixture by $^{31}$P NMR showed one major peak at δ=46 ppm, corresponding to a rearrangement product, and nothing at 117 ppm relative to 85% H$_3$PO$_4$ where the starting phosphinite phosphorus appears.

EXAMPLE 20

4-(2-Hydroxypropyl)polystyrene

A 3.0 g sample of brominated polystyrene containing 29% of bromine and crosslinked with 1 wgt % of divinylbenzene was placed on one side of an H-reator. Butyl lithium (20 mL, 2.4 M) was syringed into the other side, the hexane solvent was mostly evaporated and replaced by 30 mL dry toluene. The toluene solution was filtered onto the polymer and the mixture was heated at 60° C. for 3 h. The polymer was filtered, the toluene poured off and fresh toluene was distilled in. After several washings the toluene was poured off and the polymer dried. Fresh toluene (30 mL) was then distilled onto the polymer followed by 1.1 mL of propylene oxide (15.7 mmol). The mixture was stirred at room temperature for 20 h., then filtered, the solvent poured off and 20 mL of isopropanol were distilled in. After stirring, the polymer was filtered again and then washed in the air with isopropanol (2×100 mL), isopropanol containing several drops of concentrated hydrochloric acid (2×100 mL) and again with isopropanol (2×100 mL). Drying overnight in a vacuum oven at 60° C. gave 2.5 g of product. Analysis for hydroxyl content gave a value of 3.7 meq OH/g of polymer.

EXAMPLES 21–22

Partially Phosphinited Hydroxypropylpolystyrene

A 1.0 g sample of the hydroxypropylpolystyrene prepared as described in Example 20 was treated in an H-reactor with di-p-tolylphosphinous chloride (0.37 g, 1.49 mmol) in pyridine (15 mL). After 3 days the mixture was filtered, washed with pyridine once and with dichloromethane several times. The dried polymer weighed 0.95 g. Phosphorus NMR Spectrum contained only a single broad peak at ca. δ 107 ppm. Fully phosphinited hydroxypropylpolystyrene was prepared similarly using an excess of phosphinous chloride. The $^{31}$P NMR spectrum contained only a single broad peak at ca. δ 107 ppm.

EXAMPLE 23

Partial Phosphination of TDI-Cross-linked PVAL

A sample of polyvinyl alcohol cross-linked with about 5% tolylenediisocyanate was dried in vacuo at 60° C. The polymer (0.33 g) was placed in an H-reactor and treated with diphenylphosphinous chloride (0.50 g, 2.25 mmol) in pyridine (15 mL) for 4 days at room temperature. After filtration, the polymer was washed several times with dichloromethane and dried. Yield: 0.23 g. Phosphorus NMR showed a substantial amount of phosphorus incorporation, with about 90% in the phosphinite form. The sample was recovered from the NMR tube, dried and used in a dimerization run (See Example 28) but no conversion of ACN was observed. (See Table V).

EXAMPLE 24

Complete Phosphination of TDI-Cross-linked PVAL

A 0.5 g sample of dried, 5% TDI-cross-linked, 80% hydrolyzed polyvinyl acetate was treated with a slight excess of di-p-tolylphosphinous chloride (2.0 g, 8 mmol) in pyridine (15 mL) for 4 days at room temperature. The polymer was filtered, washed with dichloromethane and dried. Yield: 0.49 g. The phosphorus NMR spectrum showed a strong peak in the region ($\delta$ 110 ppm) expected for phosphinite and a smaller peak in the P(V) region. Thus, although there was no weight gain, the recovered material contained an appreciable amount of phosphorus. This polymer was used in a dimerization reaction with neopentyl alcohol. (See Example 28). No conversion of ACN was indicated by GLC.

EXAMPLE 25

Fully Phosphinited TOYOPEARL ®

A 1.0 g of dried, coarse TOYOPEARL® was treated with excess di-p-tolylphosphinous chloride (2.5 g, 10 mmol) in pyridine (20 mL) in an H-reactor. After 2 days at room temperature the reaction was stopped. The mixture could not be filtered, so the pyridine was pumped off and dichloromethane distilled in. The polymer was stirred briefly, then filtered. After several more washings with dichloromethane, the product was dried on the vacuum line. An appreciable amount of material was lost due to the fine particles being pulled up into the vacuum line. Yield: 1.45 g. The $^{31}$P NMR spectrum showed a strong broad peak at $\delta$ 115 ppm phosphinite phosphorus and a number of sharp resonances of lower intensities due to monomeric phosphorus species.

EXAMPLE 26

Partially Phosphinited TOYOPEARL ® (30%)

Superfine TOYOPEARL ® (3.0 g) was treated with about 0.3 equivalents of di-p-tolylphosphinous chloride (1.4 g) in pyridine for 2 days at room temperature. The product was filtered in a glove bag and washed with dichloromethane, then dried overnight in a vacuum oven. It was then washed repeatedly with dichloromethane in an H-reactor and redried. Yield: 2.7 g. Phosphorus NMR shows a broad peak in the phosphinite region and a smaller broad peak in the P(V) region.

EXAMPLE 27

Partially Phosphinited TOYOPEARL ® (6%)

A 4.0 g sample of coarse TOYOPEARL ® was treated with about 0.06 equivalents of di-p-tolylphosphinous chloride (0.44 g, 1.77 mmol) in pyridine (30 mL). The mixture was stirred overnight at room temperature, filtered under argon and washed with dichloromethane, then dried on the vacuum line. Yield: 4.35 g. The phosphorus NMR showed a single broad resonance at 115 ppm (due to phosphinite phosphorus) and a small amount of a monomeric P(V) compound.

COMPARATIVE EXAMPLE 28

Dimerizations of acrylonitrile using hydroxyl-containing polymer-bound phosphinites of Examples 21–27 were run in accordance with the procedure of Example 8 excepting that no isopropanol was added. In runs 6–7 wherein all the OH groups of polymer-bound catalyst were converted into phosphinite at the start of the reaction, neopentyl alcohol was added. See Table V for a summary of results.

ACN Dimerization Runs 6–8 of Example 28

Dimerization using Fully Phosphinited Toyopearl and Neopentyl Alcohol

A dimerization reaction was carried out in accordance with the procedure and apparatus of Example 8 using the fully phosphinited TOYOPEARL of Example 25 as the catalyst and neopentyl alcohol as the added alcohol. After 20 h, the reaction mixture was analyzed. Conversion was 90% and selectivity to 1,4-dicyano-1-butenes also about 90%. The reaction mixture was filtered, concentrated and the phosphorus NMR Spectrum was obtained on a methylene chloride solution of the residue. The $^{31}$P NMR spectrum showed several peaks, the major ones being at $\delta$ 112 ppm, due to neopentyl di-p-tolylphosphinite, and at $\delta$ 29 ppm, probably due to the tertiary phosphine oxide. The $^{31}$P NMR spectrum of the recovered polymer showed no polymer-bound phosphorus. Repetition of the experiment gave 14% conversion after 3 h, with >90% selectivity; in addition to the peaks noted above, the $^{31}$P NMR showed a smaller peak at $\delta$-50 ppm due to the pentacoordinate phosphorane.

TABLE V

ACN Dimerization Runs Using Various Polymer-Bound Phosphinite Without Added Alcohol[a]

| Polymer[b] | % p[c] | Time (Hr.) | Results |
|---|---|---|---|
| 1. PS—OP—Tolyl[1] [2] | 40 | 22.5 | No ACN conversion |
| 2. PS—OP—Tolyl[1] [2] | 40 | 5 | Mainly P(V) |
| 3. PS—OP—Tolyl[1] [2] | 5 | 24 | No ACN conversion |
| 4. TDI—PVAL[3] | 40 | 6 | No ACN conversion |
| 5. TDI—PVAL[4] | 100 | 24 | No ACN conversion |
| 6. TOYOPEARL ®[5] | 100[d] | 20 | 90% Conversion; 90% selectivity to DCB-1; No polymer-bound phosphorus after 20 hrs; neopentyl di-p-tolylphosphinite present |
| 7. TOYOPEARL ®[5] | 100[d] | 3 | 14% conversion; 90 selectivity to DCB-1; No polymer-bound phosphorus after 3 hrs; neophentyl di-p-tolyl-phosphonite and P(V) present |
| 8. TOYOPEARL ®[6] | 6 | 24 | 11% conversion; 36% selectivity to DCB-1 |

Footnotes to Table V
[a]60° C. Typical amounts: 9 mL of toluene, 3 mL of ACN, 1 mL of cyclohexane, 0.2 mmol of phosphorus.
[b]PS—O = 4-(2'-hydroxy-1'-propylpolystyrene crosslinked with 10% of divinyl benzene (See Examples 21–22); TDI-PVAL = 5% Tolylene diisocyanate crosslinked polyvinyl alcohol.
[c]Percent of polymer-bound OH groups derivatized with P-(p-CH$_3$C$_6$H$_5$)$_2$ groups.
[d]Neopentyl alcohol was added.
Preparation of Polymers listed in Table V
1. See Examples 21, 22.
2. See Examples 21, 22.
3. See Examples 23.
4. See Examples 24.
5. See Examples 25.
6. See Examples 27.

EXAMPLE 29

Preparation of Polystryrene-bound Phosphonous Dichloride

In a typical reaction, 6 g (57.6 mmol) of polystyrene beads, 1% crosslinked with divinylbezene, 200–400 mesh (Bio-Beads) and 1.92 g (14.4 mmol 0.25 equivalent) of aluminum chloride (AlCl₃) were charged into a large H-reactor which was equipped with a reflux condenser and argon inlet. Phosphorus trichloride (PCl₃, 90 mL) was syringed into the opposite side of the reactor, degassed, and then filtered onto the polymer. The swollen resin was heated to 60° C. and stirred for 3 hours. The reaction mixture was filtered and the filtrate was poured off under a stream of argon. Approximately 70 mL of tetrahydrofuran (THF) were distilled onto the polymer, stirred briefly at room temperature and filtered. The THF was distilled back onto the polymer and it was washed 2 additional times. The above washing procedure was repeated with a total of three batches of THF. The dichloride was then dried in vacuo. A ³¹PNMR showed one peak at 162 ppm relative to H₃PO₄ as expected for an aryl phosphonous dichloride. This procedure afforded a polymer with 25% of its rings functionalized. A higher or lower percentage, to a maximum of 75–80%, can be obtained by the addition of a stoichiometric amount of AlCl₃. However, 1% crosslinked polystrene-bound phosphinite having 50% and 75% of the phenyl rings of the polystrene functionalized with phosphorous (as phosphinite) proved to be less active catalyst in the ACN dimerization reaction. Thus, it is preferred to use 0.25 equivalents of aluminum chloride in this reaction to give polystryrene-bound phosphonous dichloride having 22–28% of the phenyl rings substituted by PCl₂ groups.

The percentage of phosphorus was determined for the polymer-bound dichloride by placing ~100 mg of an accurately weighed sample into a 250 mL beaker and adding 100 mL of deionized H₂O and 5 mL of nitric acid. The resulting suspension was stirred a minimum of 1 hour at room temperature. The expected reaction is:

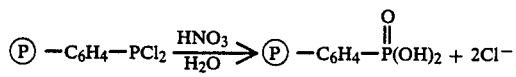

The mixture was then titrated with 0.1 N AgNo₃ using a chloride specific electrode to determine moles of Cl⁻ (the moles of phosphorus should be one-half this amount).

EXAMPLE 30

Preparation of Polystrene-Bound Phosphinite having formula

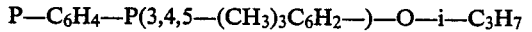

(a) Preparation Polymer-Bound Phosphinous Chloride

The polymer-bound phosphinous dichloride of Example 29 (6 gm, 11.6 mmol, with 25% of the phenyl groups functionalized) and AlCl₃ (2.63 gm, 19.7 mmol) were placed in a large H-reactor. Approximately 90 mL of 1,2,3-trimethylbenzene were syringed into the opposite side and degassed. The liquid was filtered onto the polymer and then stirred at 100° C. for 1 hour. The suspension was filtered and the filtrate was removed under argon. Approximately 50 mL of the THF were distilled onto the polymer, which was washed 3 times. The filtrate was poured off under argon and the entire washing procedure was repeated with two additional batches of THF. The polymer-bound phosphinous chloride was dried in vacuo; ³¹PNMR showed one major peak at 83.9 ppm.

(b) Initial Preparation of Phosphinite

The previously prepared polymer-bound phosphinous chloride (1.5 gm, 2.1 mmol) was placed in a large H-reactor and 30 mL of dry THF and 4 mL of pyridine were distilled in. The suspension was stirred at room temperature for one-half hour. Then iso-propanol (4 mL) was distilled onto the opposite side of the H-reactor and was slowly allowed to distill onto the reaction mixture which was stirred at 0° C. This was warmed to room temperature and was stirred an additional hour. The suspension was filtered and the polymer was washed with 3 separate batches of THF/i-PROH mixture (50:50). The phosphonite prepared by this method was dried in vacuo. When employed as the ACN dimerization catalyst it afforded only 10% conversion.

(c) Polystyrene-Bound Phosphinite Preparation by Hydrolysis Route

The polymer-bound monochloride of Example 30a (1.5 gm, 2.5 mmol) was placed into a large H-reactor and 35 mL of THF were distilled in. Under a flow of argon, 35 mL of degassed, deionized water were syringed onto the polymer suspension while it was still cold. This mixture was stirred 2 hours at room temperature to form polymer-bound phosphine oxide. This was filtered and the filtrate was poured off under argon. To wash the polymer, 35 mL of THF was distilled into the reactor and 35 mL of degassed, deionized water were syringed in under argon. The suspension was stirred 15 min and then filtered. The filtrate was poured off under argon and the polymer was washed with 3 batches of THF and then dried in vacuo overnight.

This polymer-bound phosphine oxide was retained in a large H-reactor without isolation and PCl₃ 90 mL was added to the opposite side under argon, degassed and filtered onto the polymer. The swollen resin was stirred at room temperature for 1 hour. The reaction mixture was then filtered and the PCl₃ was distilled back onto polymer and was stirred for 15 min. The mixture was filtered and the filtrate was poured off under argon. The polymer-bound phosphinous chloride was washed with 3 batches of THF (about 20 mL) and then dried in vacuo. The ³¹P NMR spectrum exhibited one peak at δ=84 ppm corresponding to the phosphinous chloride. The phosphinite was then prepared as previously described from the monochloride. The ³¹PNMR spectrum of the final product showed one major peak at δ=106 ppm relative to H₃PO₄. The polymer prepared in this manner was an active catalyst for the dimerization of ACN and yielded approximately 35% conversion to dimers in 3 hours.

EXAMPLE 31

Preparation of Polystyrene-Bound phosphinite having the formula

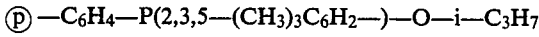

The procedure of Example 30a was followed except that 1,2,4-trimethylbenzene was used in step (a). After hydrolysis of the phosphinous chloride to the phosphine oxide, and regeneration of the phosphinous chloride. The polystyrene phosphinite having the formula

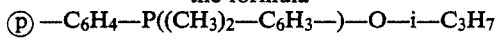—C6H4—P(2,3,5—(CH3)3C6H2—)—O—i—C3H7
was prepared by use of isopropanol and pyridine.

EXAMPLE 32

Preparation of Polystyrene-Bound Phosphinite having the formula

Ⓟ—C6H4—P((CH3)2—C6H3—)—O—i—C3H7

The procedure of Example 31 was followed except that o-xylene was used in step (a).

EXAMPLE 33

Preparation of Polystyrene-Diisopropylphosphonite (a) Initial Preparation of Polymer-Bound Phosphonite The polymer-bound phosphinous dichloride (3 gm, 9.7 mmol of P, containing 50% of its rings functionalized) prepared in a manner analogous to that described in Example 29, was placed in a large H-reactor and about 50 mL of THF and 5 mL of pyridine were distilled in. The suspension was stirred at room temperature for about 30 min to allow the polymer to swell fully in the solvents. Then isopropanol (5 mL) was distilled into the opposite side of the H-reactor and slowly allowed to diffuse onto the polymer mixture which was stirred at $-30°$ C. After the addition was complete, the suspension was slowly warmed to room temperature and then stirred an additional 1½ hours. The mixture was filtered and the filtrate was poured off under argon. The polymer-bound phosphonite was washed 3 times with 3 separate batches of a mixture of THF/i-PrOH. The filtrate was poured off under argon and the polymer dried in vacuo.

(b) Preparation of Polymer-Bound Phosphonite Via Hydrolysis Route

The polymer-bound phosphonite of Example 33a (3.65 gm, 7.2 mmol P) was placed into a large H-reactor and 35 mL of THF was distilled in. To this cold suspension 35 mL of HCl/i-PrOH (10/25) was added via syringe under argon. The mixture was degassed and then stirred at room temperature for 2 hours. The polymer suspension was filtered and the filtrate was poured off under argon. At this point, an additional 35 mL of THF was distilled in and 35 mL of H2O was syringed in under argon. The mixture was degassed, stirred at room temperature for one-quarter hour, then filtered and the filtrate was poured off under argon. The resulting polymer-bound phosphonous acid was washed with 3×40 mL THF and then dried in vacuo.

This phosphonous acid was retained in the large H-reactor without isolation. To the opposite side, 90 mL of PCl3 was syringed in under argon, degassed and filtered onto the polymer. The swollen resin was stirred at room temperature for 1 hour and then filtered. The PCl3 was distilled back onto the polymer and the mixture was stirred ~15 min before refiltering. The filtrate was poured off under argon and the polymer was washed 3-4 times with THF. The polymer-bound phosphonous dichloride was then dried in vacuo. The phosphonite was prepared from the dichloride as described earlier. The $^{31}$P NMR spectrum showed two peaks at $\delta=156$ (about 90%) and $\delta=21$ ppm (about 10%) indicative of the phosphonite and phosphinate, respectively.

EXAMPLE 34

Acrylonitrile Dimerization Using Flow Reactor

The following dimerization runs were performed in the apparatus illustrated in FIG. 2 and in accordance with the procedure detailed in Example 11 with the following modification made in an effort to avoid some of the mechanical difficulties encountered in the previous runs. Two five-micron teflon filters were installed in parallel prior to the pump (11), so that the flow could be switched to a clean filter if one should plug. The filters are necessary to keep the pump free of small particles that prevent the check valves from seating properly. All of the Teflon valves in the assembly were drilled out to ⅛" bore in order to prevent plugging. Finally, a special Teflon shaft was designed and fabricated by the machine shop for the top (effluent) end of the reactor column. The small hole and filter in our previous assembly had plugged repeatedly with fine polymer beads and precipitated by-products. Use of the new shaft completely eliminated this problem.

The first three runs described below were carried out in a similar manner except for the differences noted under each run. The phosphinite catalyst (2 g), phosphonite drying agent (2 g) and dried 3A molecular sieves were each loaded into separate glass HPLC columns in a dry box. The system was then assembled on the laboratory bench, with the sieve column first in line after the pump, the phosphonite column next, and the phosphinite column last. A mixture of dry toluene (200 mL)/isopropanol (20 mL) was transferred to the feed reservoir and pumped (7 psig) through the system until all of the argon bubbles were eliminated. At that point the columns were heated to 60° C., and the reagent feed solution was introduced into the reservoir. As in previous experiments, all of the reagents were rigorously dried and transferred on a vacuum line.

The flow rate was set to give initial conversion of about 60% on the phosphinite column, based on previous experience. The presence of the phosphonite column caused some conversion to take place on that column, however, especially when it was heated. The results in Tables VI-XII show total conversion and conversion on the phosphinite catalyst column.

Samples of the reaction mixture were analyzed on a Hewlett Packard 5880A Level Four Gas Chromatograph using a ⅛"×3' Porapak P column and a temperature program starting a 60° C., increasing at 8° C. min for 4 min, then increasing at 30° C./min to 240° C. and holding 8 min. Conversion on the phosphinite (second column) was determined by comparison of the gas chromatograms of samples taken at valves 17 and 25 of FIG. 2. Similarly, conversion on the catalyst column as illustrated in FIG. 2 was determined by samples from valves 25 and 17. Total conversion was calculated by comparison of samples from the beginning (valve 17 of FIG. 2) and end (valve 25 of catalyst column) of the flow system. Selectivities to dimers were determined as described in Example 11.

The high activity of the phosphonite in catalyzing conversion of acrylonitrile to dimers led us to carry out a run in which only the phosphonite was used as catalyst. For this experiment, Run 4, the molecular sieve column was retained, but the phosphinite column was eliminated.

FLOW RUNS

Run 1

For this run, the diisopropyl phosphonite used was prepared as described in Example 33a by esterification of a phosphonous dichloride, followed by thorough washing, but without an intervening hydrolysis step. The polystyrene-bound phosphinite of Example 30b was used in one column.

Table VI shows that the initial total conversion of 62% steadily decreased during the 148 hours of the run. By the end of the reaction, the conversion had dropped to 18%, a poorer performance than some of our previous results in which no phosphonite column was incorporated. Although the phosphonite appeared to behave well in a batch experiment, it apparently contained some impurities which were gradually eluted which change color from yellow to white. We believe that the steady decline in conversion is due to these impurities. Our batch experiments have shown that impure phosphonites can cause rapid degradation of the phosphinite catalysts. The one bright feature of this run is that it was the first long-term flow run in which no mechanical difficulaties were encountered.

Run 2

The phosphonite resin used in Runs #2–4 had formula $\textcircled{p}$—$C_6H_4$—$P((CH_3)_2C_6H_3$—$)O$—$i$—$C_3H_7$ and was prepared by the hydrolytic route described in Example 32. Due to hydrolysis or rearragement, however, less than 50% of the phosphorus was in the correct form. Initially, all three of the columns were heated to 60° C.; however, as can be seen in Table VIII, the conversion on the phosphonite column was substantial. Consequently, the temperature of this column was lowered to ambient after 25 hours and kept there for the duration of the run. The activity of the phosphonite column for acrylonitrile conversion declined steadily to near zero after 80 hours. It is believed that the phosphonite's activity as a water scavenger is reflected in its activity as a dimerization catalyst. We believe that the unnecessary high temperature (60° C.) and the remaining aluminum species degraded the phosphonite. Accordingly it could not serve as a water scavenger. This is supported by the results discussed under Run 4.

The diminishing ability of the phosphonite to remove water led to a faster than expected decline in the activity of the phosphinite column. Conversion on the phosphinite column declined from an initial 54% (normalized for the conversion on the phosphonite column) to a final value of 26% at 197 hours. The run was terminated at that point because we had exhausted our supply of reagents.

The phosphinite catalyst (Example 30c) gave an average selectivity of 91% to dimers and 84% to the desired linear dimers. Approximately 550 catalyst turnovers were obtained, based on the amount of phosphorus present in the initial phosphonous dichloride. These results surpass those from all but one of the previous flow dimerization runs.

Run 3

For this run two phosphonite drying columns were installed in parallel, so that one could be used until it was spent and the flow could then be switched without opening the system. This time the phosphonite columns were maintained at room temperature from the beginning. The high activity of the phosphonite (about 80% of the phosphorus was in the active form) still leads to significant conversion even at this temperature, however, so the results for conversion on the phosphinite column are corrected. Conversion on the phosphonite column offers a convenient way of monitoring its water-scavenging activity, so the columns were changed after this conversion had dropped to 1% (Table X).

This run was the most successful to date. Conversion on the phosphinite column stayed nearly constant at 62% for the first 104 hours. The phosphonite column was changed at that time and although the overall conversion increased due to the new phosphonite, conversion on the phosphinite dropped slightly to 58%. A slow decline continued through 185 hours, reaching 49% at that time. The flow rate was then doubled in order to obtain some kinetic information. At this flow rate the conversion was 29%; after 25 hours at this flow rate the conversion dropped to 24%. After 210 hours of run the flow rate was again increased by 33%, which resulted in a conversion of 20%. These data show that the conversion is not directly proportional to the flow rate and that diffusion may play a role. The run was stopped at 216 hours, with 16% conversion at a flow rate about three times higher than the original one.

The selectivity to linear dimers for the entire run was 86%, the best achieved to date. Approximately 850 catalyst turnovers were obtained, and the results suggest that the experiment could have been continued for many additional hours.

Run 4

The high activity of the phosphonite columns even at room temperature led us to carry out one run in which only the phosphonite was used as the catalyst column. The phosphonite used had about 45% of the rings substituted and was prepared by the hydrolytic route. Initial conversion at 60° C., was 66%, even at a flow rate 44% higher than that used in the previous runs. The activity of the catalyst declined rapidly, however, and the run was terminated at 28.6 hours at a conversion of 18.5% (see Table XII). Selectivity to linear dimers was 80%, somewhat lower than with the phosphinite.

TABLE VI

| Conversion of ACN in Run #1 of Example 34 | |
|---|---|
| RUN TIME (hrs) | % CONVERSION |
| 9.0 | 62[a] |
| 20.7 | 54 |
| 27.1 | 53 |
| 35.5 | 48 |
| 45.5 | 46 |
| 71.2 | 44 |
| 81.0 | 40 |
| 94.75 | 36 |
| 117.0 | 31 |
| 131.0 | 26 |
| 140.7 | 21 |
| 148.0 | 18 |

[a]Flow Rate = 8.0 mL/hr
[b]10 gm 3A molecular sieves - column $C_1$
2 gm phosphonite (#A0012-46) - column $C_2$
2 gm phosphonite (#A0012-62) - column D

TABLE VII

| Analysis of Samples From Run 1 of Example 34 | | |
|---|---|---|
| SAMPLE | WEIGHT[a] (g) | WEIGHT RESIDUE (g) | DIST. YIELD[b] OF DIMERS, % |
| 1 | 57.6 | 1.19 | 75 |
| 2 | 80.2 | 8.30 | 89 |
| 3 | 100.0 | 9.29 | 84 |
| 4 | 74.6 | 5.87 | 89 |
| 5 | 75.2 | 6.30 | 87 |
| 6 | 89.8 | 6.44 | 88 |
| 7 | 69.8 | 4.82 | 87 |
| 8 | 92.9 | 5.60 | 91 |
| 9 | 65.7 | 3.00 | 90 |

TABLE VII-continued

Analysis of Samples From Run 1 of Example 34

| SAMPLE | WEIGHT (g) | WEIGHT[a] RESIDUE (g) | DIST. YIELD[b] OF DIMERS, % |
|---|---|---|---|
| 10 | 92.9 | 5.15 | 89 |
| 11 | 45.8 | 2.17 | 92 |
| 12 | 106.2 | 4.46 | — |
| 13 | 56.0 | 1.89 | 89 |
| 14 | 67.9 | 0.92 | 89 |
| Total acrylonitrile = converted | | 66.7 g | |

[a]Weight after concentration on rotary evaporator at 35° C. (1 mm Hg)
[b](Total dimers/Wt of residue) × 100; from Kugelrohr distillation at 75–100° C. (0.1 mm Hg). Present linear dimers = 92%.

TABLE VIII[c]

% CONVERSION OF RUN #2 OF EXAMPLE 34

| RUN TIME Hrs. | PHOSPHONITE | PHOSPHINITE | TOTAL |
|---|---|---|---|
| 8.4 | 48 | 54 | 76[a] |
| 20.0 | 44 | 53 | 74 |
| 25.0 | 44 | 51 | 73 |
| 28.5 | 12[b] | 60[b] | 65[b] |
| 35.2 | 8.0 | 51 | 55 |
| 44.5 | 5.3 | 50 | 53 |
| 57.5 | 2 | 46 | 48 |
| 70.8 | 2 | 46 | 48 |
| 81.3 | 1 | 45 | 46 |
| 96.25 | — | 40 | 40 |
| 106.6 | — | 41 | 41 |
| 117.0 | — | 40 | 40 |
| 124.5 | — | 39 | 39 |
| 129.8 | — | 37 | 37 |
| 140.4 | — | 35 | 35 |
| 148.75 | — | 34 | 34 |
| 163.7 | — | 33 | 33 |
| 172.7 | — | 33 | 33 |
| 197.1 | — | 26 | 26 |

[a]Flow Rate = 7.8 mL/hr
[b]Phosphonite cooled to room temperature
[c]10 gm (3A) molecular sieves - column $C_1$
2 gm phosphonite (#A0211-1) - column $C_2$
2 gm phosphinite (#A0012-62) - column D

TABLE IX

ANALYSIS OF SAMPLES FROM RUN 2 OF EXAMPLE 34

| SAMPLE | WEIGHT (g) | WEIGHT[a] RESIDUE (g) | DIST. YIELD[d] OF DIMERS, % |
|---|---|---|---|
| 1 | 97.4 | 11.81 | 88 |
| 2 | 58.0 | 7.37 | 88 |
| 3 | 44.2 | 4.28 | 92 |
| 4 | 74.0 | 6.97 | 91 |
| 5 | 76.1 | 6.78 | 91 |
| 6 | 85.9 | 7.25 | 91 |
| 7 | 69.2 | 5.43 | 91 |
| 8 | 97.8 | 7.10 | 91 |
| 9 | 73.5 | 5.03 | 91 |
| 10 | 86.5 | 5.86 | 91 |
| 11 | 71.6 | 4.55 | 91 |
| 12 | 85.9 | 4.82 | 92 |
| 13 | 34.7 | 2.23 | 91 |
| 14 | 102.5 | 5.98 | 90 |
| 15 | 93.2 | 5.38 | 91 |
| 16 | 75.9 | 3.85 | 91 |
| 17 | 110.2 | 3.78 | 92 |
| GC Samples | | 0.33 | 91 |
| Total acrylonitrile = converted | | 98.9 g | |

[a]Weight after concentration on rotary evaporator at 35° C. (1 mm Hg)
[b](Total dimers/Wt of residue) × 100; from Kugelrohr distillation at 75–100° C. (0.1 mm Hg). Percent linear dimers = 92%.

TABLE X[a]

% CONVERSION OF RUN #3 OF EXAMPLE 34

| RUN TIME Hrs. | PHOSPHONITE | PHOSPHINITE | TOTAL |
|---|---|---|---|
| 17.0 | 12.3 | 62 | 67[c] |
| 24.75 | 14.0 | 62 | 69 |
| 31.0 | 15 | 62 | 68 |
| 41.75 | 13.8 | 62 | 67 |
| 49.2 | 10.8 | 62 | 67 |
| 66.5 | 12.0 | 58 | 63 |
| 81.0 | 7.8 | 60 | 62 |
| 94.7 | 1.2 | 62 | 62 |
| 104.3 | 1 | 62 | 62 |
| 113.9 | 3.5 | 57 | 58 |
| 120.5 | 13.5[b] | 58 | 64 |
| 125.7 | 15.0 | 57 | 63 |
| 137.0 | 9.4 | 55 | 60 |
| 143.8 | 13.5 | 55 | 61 |
| 161.0 | 8.7 | 54 | 58 |
| 168.7 | 14 | 52 | 58 |
| 174.8 | 6.4 | 54 | 57 |
| 185.1 | 8.1 | 49 | 53 |
| 197.8 | 6.8 | 29 | 34[d] |
| 209.6 | 3 | 24 | 27 |
| 213.4 | 1 | 20 | 21[e] |
| 215.9 | 6 | 16 | 21 |

[a]10 gm 3A molecular sieves - column $C_1$
1.6 gm phosphonite (#A0211-27) - column $C_{2A}$
2.0 gm phosphonite (#A0211-41) - column $C_{2B}$
2.0 gm phosphinite (#A0211-34) - column D
[b]Switched to phosphinite in column $C_{2B}$
[c]Flow Rate = 7.7 mL/hr
[d]Flow Rate = 15.2 mL/hr
[e]Flow Rate = 20.5 mL/hr

TABLE XI

ANALYSIS OF SAMPLES FROM RUN #3 OF EXAMPLE 34

| SAMPLE | WEIGHT (g) | WEIGHT[a] RESIDUE (g) | DIST. YIELD[b] OF DIMERS, % |
|---|---|---|---|
| 1 | 197.6 | 21.28 | 92 |
| 2 | 266.6 | 28.64 | 92 |
| 3 | 203.8 | 19.41 | 93 |
| 4 | 174.8 | 17.01 | 93 |
| 5 | 160.6 | 16.44 | 91 |
| 6 | 75.9 | 8.95 | 89 |
| 7 | 168.6 | 17.53 | 90 |
| 8 | 134.4 | 8.23 | 90 |
| 9 | 154.5 | 7.03 | 91 |
| 10 | — | 5.63 | |
| GC Samples | | 0.70 | |
| Total Acrylonitrile = Converted | | 150.85 g | |

[a]Weight after concentration on rotary evaporator at 35° C. (1 mm Hg).
[b](Total dimers/Wt of residue) × 100; from Kugelrohr distillation at 75–100° C. (0.1 mm Hg). Present linear dimer = 93%.

TABLE XII[b]

| RUN TIME (hrs) | % CONVERSION OF RUN #4 OF EXAMPLE 34 |
|---|---|
| 4.25 | 66[a] |
| 10.7 | 64 |
| 21.5 | 32.5 |
| 23.25 | 28.0 |
| 28.6 | 18.5 |

[a]Flow rate = 11.2 mL/hr
[b]10 gm 3A molecular sieves - column $C_1$
2 gm phosphonite (#A0211-23) - column D

We claim:
1. A process for the preparation of a polymeric substance having formula I, (p)—$C_6H_4$—P(Ar')OR which comprises the steps of:
   (a) contacting a polymer containing aromatic groups with $PX_3$, in the presence of an effective amount of a Friedel-Crafts catalyst, for a time sufficient to produce a polymer containing aromatic groups substituted with PX₂ wherein X is F, Cl, Br or I;

(b) contacting the polymer containing the aromatic groups substituted with PX₂, in the presence of an effective amount of a Friedel-Crafts catalyst, with an aromatic compound Ar'H having formula:

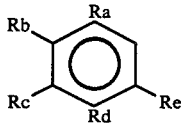

wherein $R_a$, $R_b$, $R_c$, $R_d$, and $R_e$ are independently N,N-dialkylamino groups, —N(R⁴, R⁵), hydrogen, straight or branched chain alkyl groups of 1 to 10 carbons or cycloalkyl groups having 5 to 10 carbons or wherein two of said $R_{a-e}$ groups form part of a fused alicyclic ring and the remainder of said $R_{a-e}$ groups are independently hydrogen, N,N-dialkylamino groups —N(R⁴, R⁵) alkyl groups having 1 to 10 carbons or cycloalkyl groups having 5 to 10 carbons, or wherein at least one of said $R_{a-e}$ groups is a N,N-dialkylamino group, —N(R⁴,R⁵), and the remainder of said $R_{a-e}$ groups are independently hydrogen or alkyl or cycloalkyl as defined hereinabove, for a time sufficient to produce a polymer having the formula ⓟ—C₆H₄—P(Ar')X;

(c) contacting the product of step (b) with an aprotic solvent and water in an amount sufficient to produce a polymer having the formula ⓟ—C₆H₄—P=O(Ar')H substantially free of residual metal-containing species;

(d) contacting the product of step (c) with PX₃ wherein X is defined as hereinabove in an amount sufficient to produce a polymer having the formula ⓟ—C₆H₄—P(Ar')X; and (c) contacting the product of step (d) with a straight or branched chain alkanol having no more than 10 carbons or cycloalkanol having 5 to 10 carbon atoms in the presence of a base for a time sufficient to produce a polymer having formula ⓟ—C₆H₄—P(Ar')OR.

2. The process of claim 1 wherein in step (b), Ar'H is trimethylbenzene or dimethylbenzene.

3. The process of claim 2 wherein in step (c) methanol, ethanol, cyclohexanol or a 2-alkanol having 3 to 10 carbon atoms is used and wherein the base in step (c) is pyridine.

4. The process of claim 1 which further comprises treating the polymer produced in step (b) with a polar solvent or with a polar solvent in the presence of a base to produce a polymer substantially free of metal-containing compounds.

5. The process of claim 1 wherein ⓟ—C₆H₄— is derived from the polymer which is polystrene crosslinked with about 1–40% divinylbenzene.

* * * * *